(12) United States Patent
Newcomb et al.

(10) Patent No.: US 11,772,706 B2
(45) Date of Patent: Oct. 3, 2023

(54) HEATED VEHICLE HEADER

(71) Applicant: GM GLOBAL TECHNOLOGY OPERATIONS LLC, Detroit, MI (US)

(72) Inventors: Bradley Allen Newcomb, Troy, MI (US); Xiaosong Huang, Novi, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/667,260

(22) Filed: Feb. 8, 2022

(65) Prior Publication Data

US 2023/0249752 A1    Aug. 10, 2023

(51) Int. Cl.
| | |
|---|---|
| *B62D 25/06* | (2006.01) |
| *B60J 1/02* | (2006.01) |
| *B62D 25/04* | (2006.01) |
| *B62D 29/04* | (2006.01) |
| *B60J 1/00* | (2006.01) |

(52) U.S. Cl.
CPC .............. *B62D 25/06* (2013.01); *B60J 1/004* (2013.01); *B62D 25/04* (2013.01); *B62D 29/043* (2013.01)

(58) Field of Classification Search
CPC ...... B62D 25/06; B62D 25/08; B62D 29/043; B60J 1/004; H05B 1/00
USPC ................................ 296/203.01–4, 210, 215
See application file for complete search history.

(56) References Cited

U.S. PATENT DOCUMENTS

| | | | | |
|---|---|---|---|---|
| 4,223,209 A | * | 9/1980 | Diaz ........................ | H05B 3/10 252/511 |
| 4,292,500 A | * | 9/1981 | Semanaz ................ | F24D 13/024 392/435 |
| 4,888,089 A | * | 12/1989 | Marstiller ................ | H05B 3/26 338/308 |
| 5,111,025 A | * | 5/1992 | Barma ................... | A47C 7/748 219/217 |

(Continued)

FOREIGN PATENT DOCUMENTS

| | | | | |
|---|---|---|---|---|
| EP | 1273206 B1 | * | 4/2005 | ............... H05B 3/56 |
| EP | 3279055 A1 | * | 2/2018 | ........... B32B 27/065 |

(Continued)

OTHER PUBLICATIONS

Bradley A. Newcomb et al.; U.S. Appl. No. 17/406,023, filed Aug. 18, 2021 titled "Transparent Composite for a Vehicle Header"; 55 pages.

(Continued)

*Primary Examiner* — Dennis H Pedder
(74) *Attorney, Agent, or Firm* — Harness, Dickey & Pierce, P.L.C.

(57) ABSTRACT

In various aspects, the present disclosure provides a component. The vehicle component includes a polymer matrix, a plurality of fibers in the polymer matrix, and a heating element embedded in the polymer matrix. The heating element may be (i) a discrete heating element, (ii) at least a portion of the plurality of fibers, or both (i) and (ii). The heating element is configured to be coupled to an external circuit to generate heat. In one aspect, the vehicle component is a vehicle header including an elongated body extending between a first side and a second side.

20 Claims, 23 Drawing Sheets

(56) References Cited

U.S. PATENT DOCUMENTS

| | | | |
|---|---|---|---|
| 6,288,372 B1* | 9/2001 | Sandberg | H05B 3/56 |
| | | | 219/544 |
| 9,420,640 B2* | 8/2016 | Li | H05B 3/03 |
| 10,457,404 B2* | 10/2019 | Chee | C09D 7/65 |
| 10,899,427 B2* | 1/2021 | Slane | B32B 15/20 |
| 11,358,647 B1 | 6/2022 | Newcomb et al. | |
| 11,420,683 B2 | 8/2022 | Newcomb et al. | |
| 11,541,939 B2 | 1/2023 | Newcomb et al. | |
| 2011/0036823 A1* | 2/2011 | Nelson | B60J 7/0092 |
| | | | 219/202 |
| 2015/0053663 A1* | 2/2015 | Sakota | H05B 3/145 |
| | | | 219/202 |
| 2020/0339019 A1* | 10/2020 | Marktscheffel | B60N 2/70 |
| 2021/0155293 A1 | 5/2021 | Aitharaju et al. | |
| 2022/0136691 A1* | 5/2022 | Wheatley | H05B 3/286 |
| | | | 219/220 |
| 2022/0212449 A1 | 7/2022 | Newcomb et al. | |

FOREIGN PATENT DOCUMENTS

| | | | | |
|---|---|---|---|---|
| EP | 3279055 B1 * | 2/2021 | | B32B 27/065 |
| WO | WO-2005055660 A2 * | 6/2005 | | H01C 17/02 |

OTHER PUBLICATIONS

Bradley A. Newcomb et al.; U.S. Appl. No. 17/406,024, filed Aug. 18, 2021 titled "Transparent Composite for a Vehicle Roof"; 53 pages.

* cited by examiner

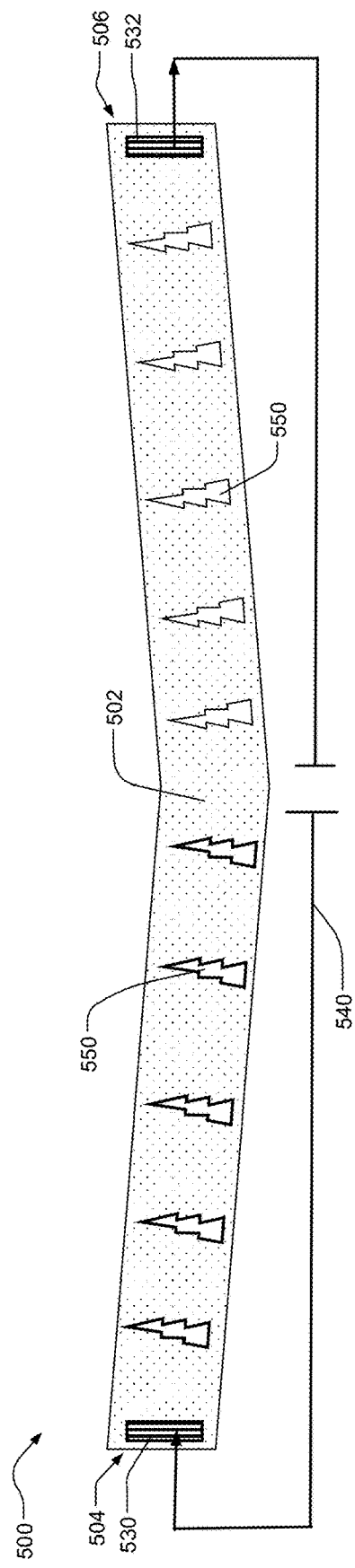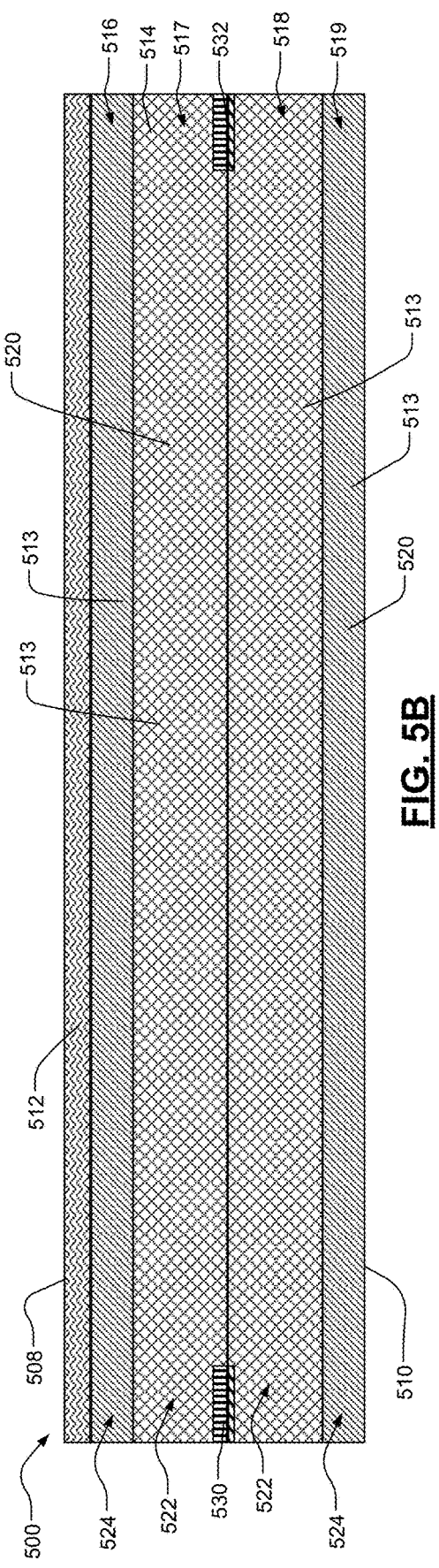
FIG. 5A
FIG. 5B

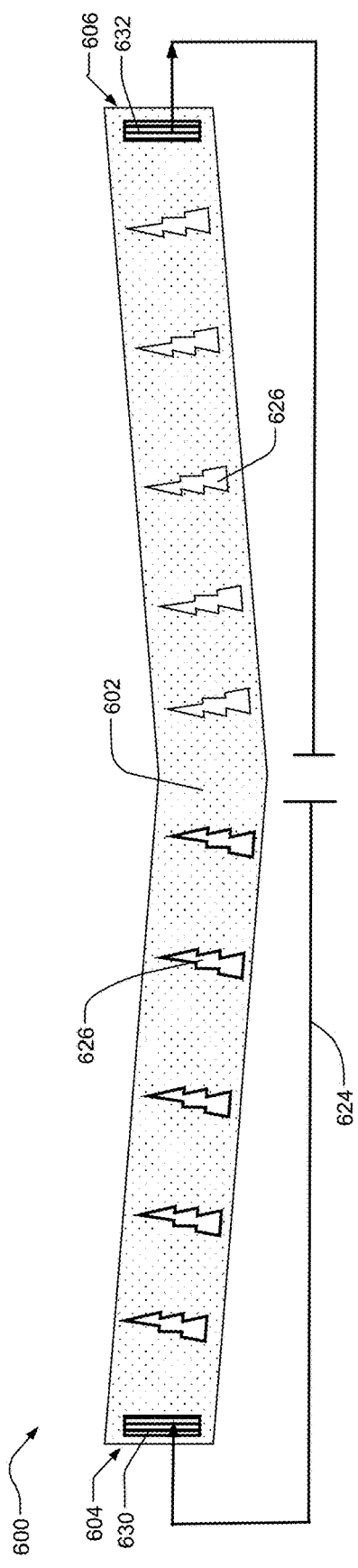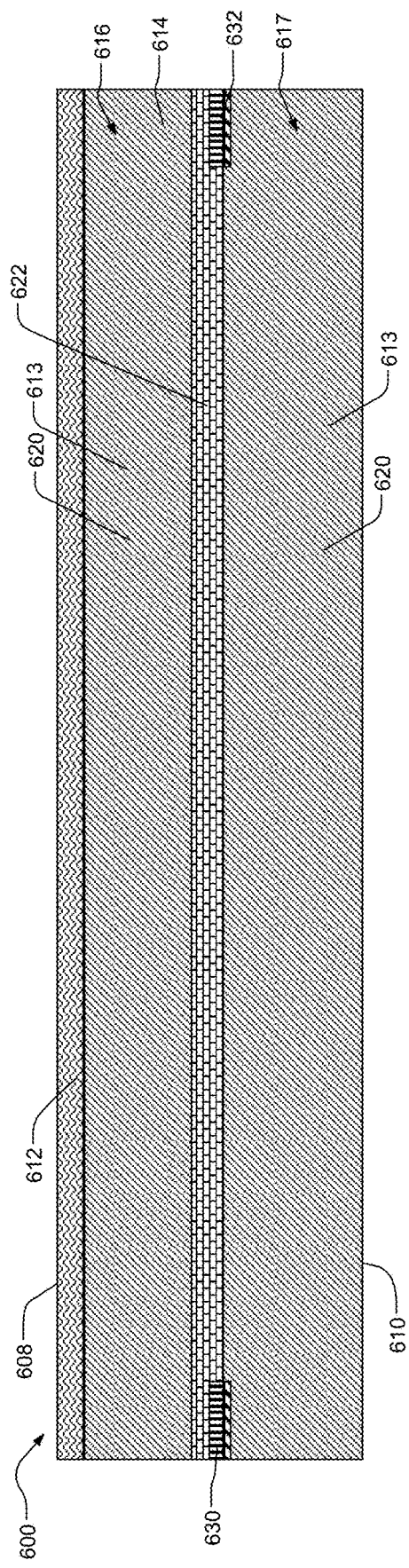

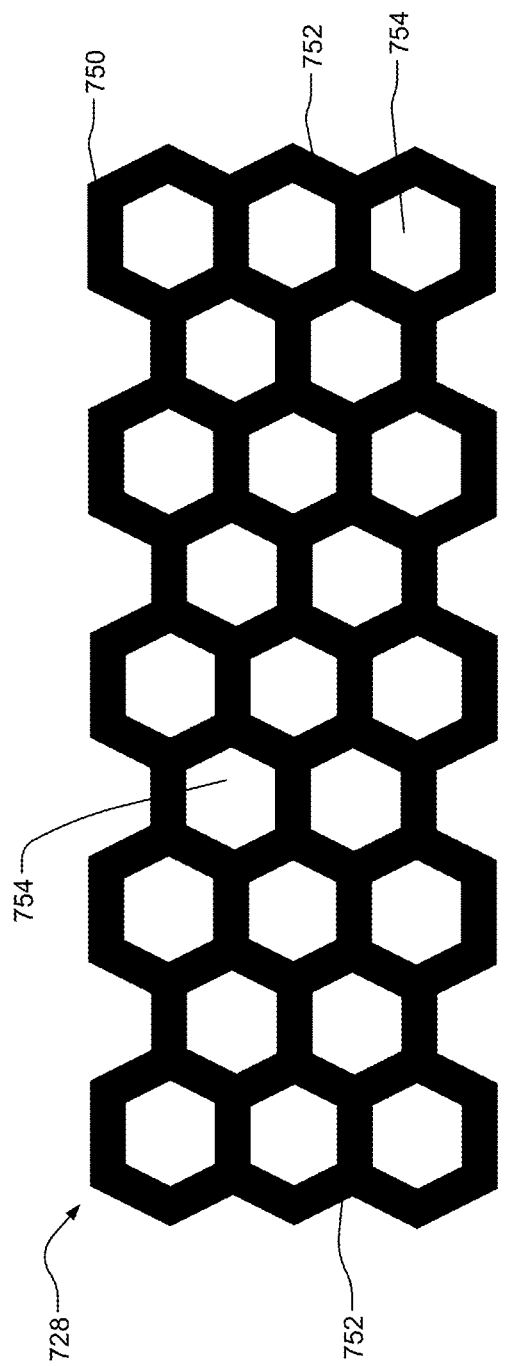

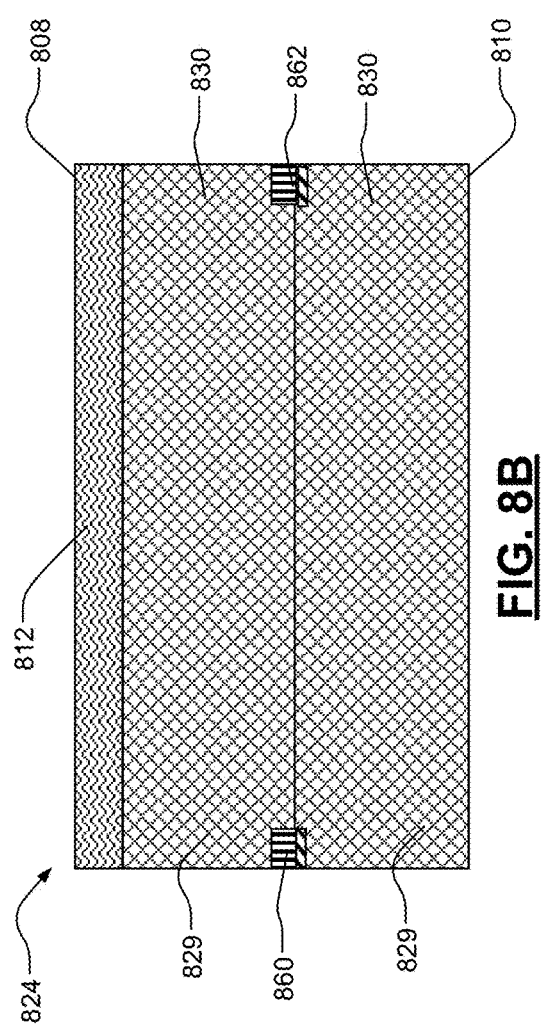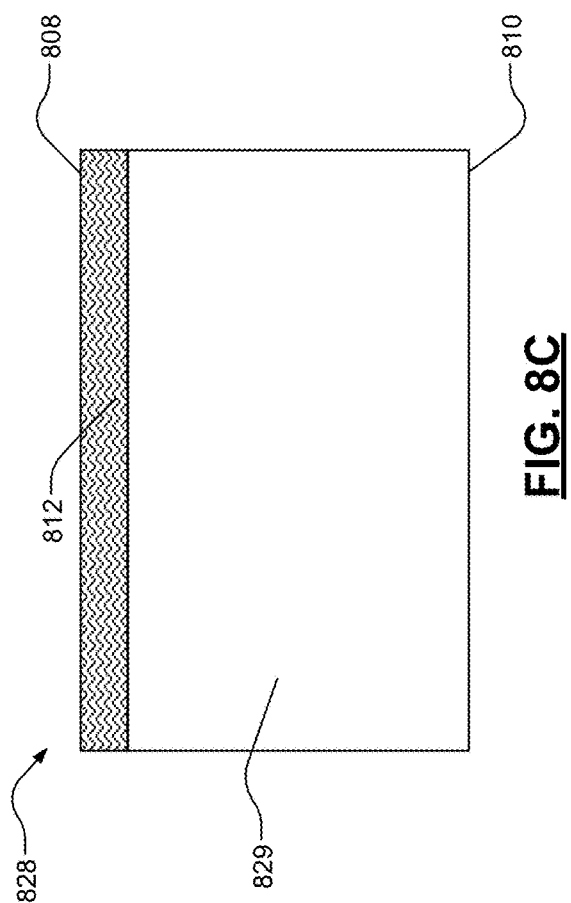

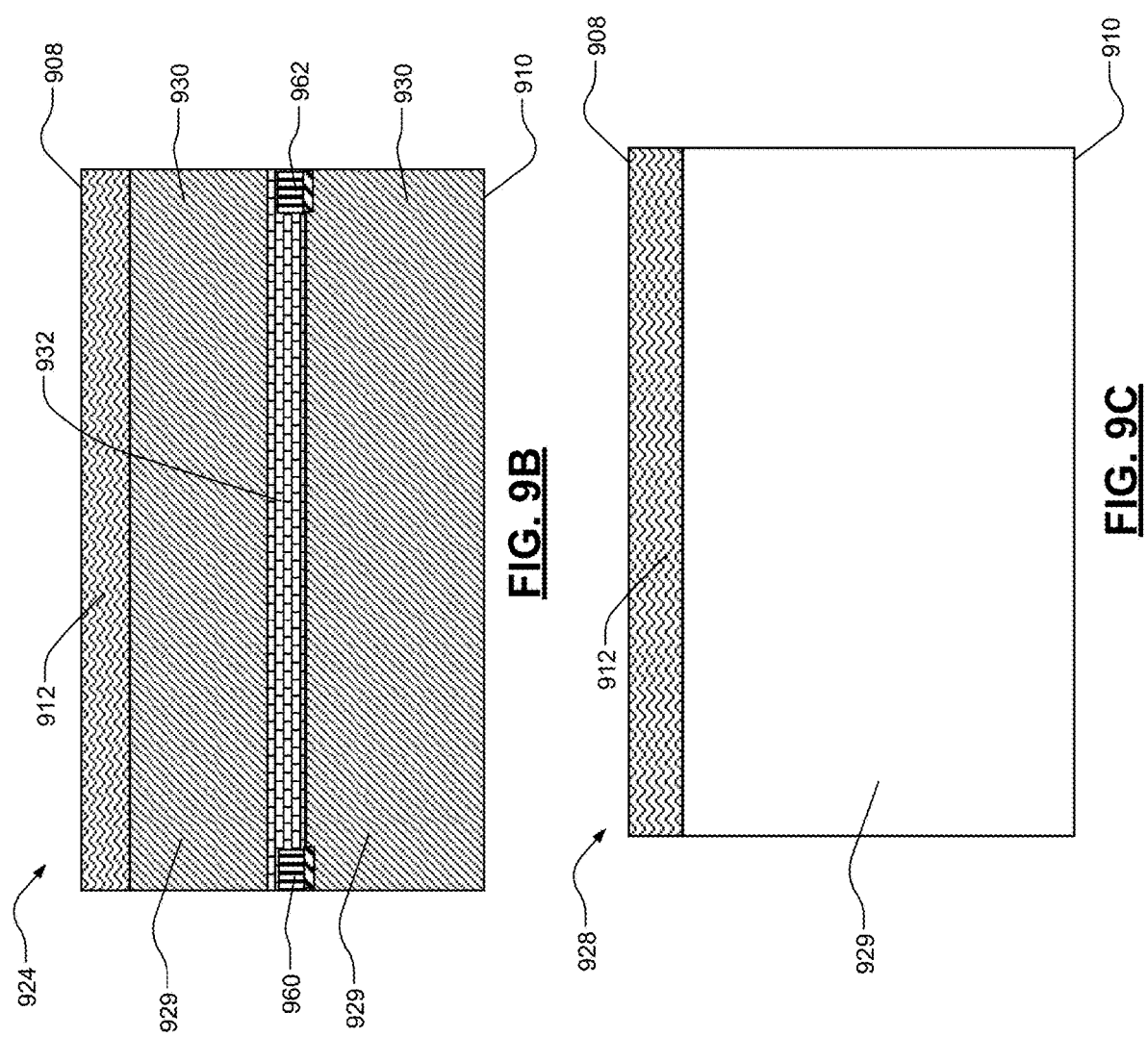

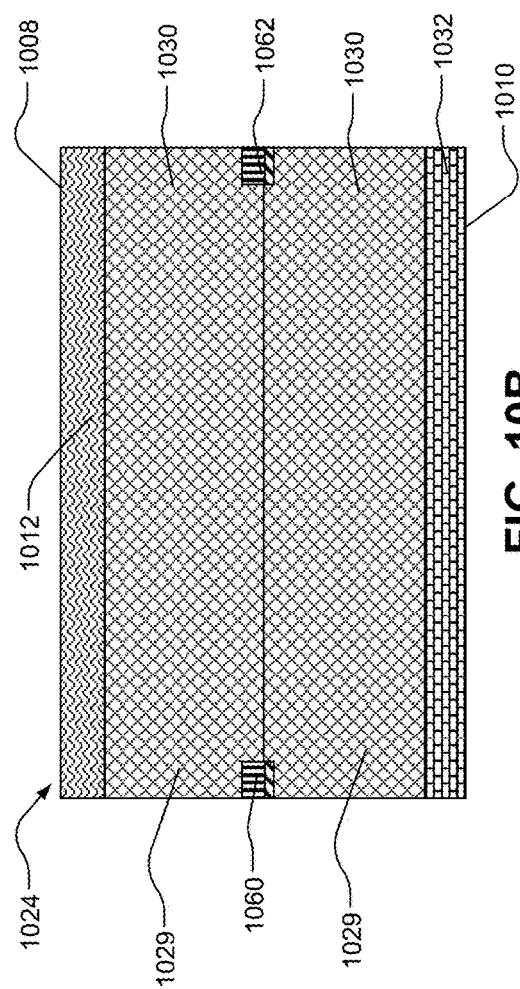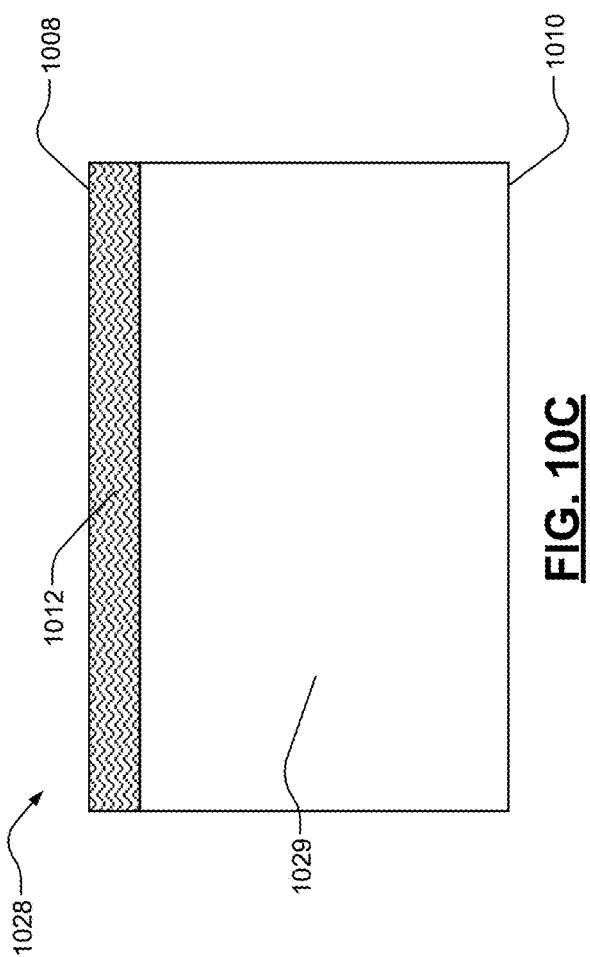

HEATED VEHICLE HEADER

INTRODUCTION

The present disclosure relates to a heated vehicle header.

This section provides background information related to the present disclosure which is not necessarily prior art.

Vehicle upper body assemblies, which include front and rear headers, provide structural support and mounting locations for other vehicle components. Vehicle components in structural assemblies that exhibit adequate strength during normal service, while increasing occupant comfort are advantageous.

SUMMARY

This section provides a general summary of the disclosure and is not a comprehensive disclosure of its full scope or all of its features.

The present disclosure relates to a composite vehicle header that is at least partially configured to generate heat and vehicle upper body assemblies including the heat generating header.

In various aspects, the present disclosure provides a vehicle header including an elongate body extending between a first side and a second side. The elongate body includes a polymer matrix, a plurality of fibers in the polymer matrix, and a heating element embedded in the polymer matrix. The heating element may be (i) a discrete heating element, (ii) at least a portion of the plurality of fibers, or both (i) and (ii). The heating element is configured to be coupled to an external circuit to generate heat in the elongate body.

In one aspect, the heating element includes the at least a portion of the plurality of fibers and the at least a portion of the plurality of fibers includes carbon fibers.

In one aspect, the heating element includes the discrete heating element. The discrete heating element includes a film. The film includes at least one layer.

In one aspect, the discrete heating element includes a material selected from the group consisting of: indium tin oxide (ITO), graphene, carbon nanotube (CNT), silver nanowire, or combinations thereof.

In one aspect, the plurality of fibers is selected from the group consisting of: carbon fibers, glass fibers, basalt fibers, aramid fibers, natural fibers, polyethylene fibers, polypropylene fibers, or any combination thereof.

In one aspect, the plurality of fibers includes a plurality of layers of woven fibers.

In one aspect, the plurality of fibers includes a plurality of tow-lines of fibers. The plurality of tow-lines of fibers cooperate to form a substantially polygonal shape.

In one aspect, the plurality of fibers includes a first portion of fibers and a second portion of fibers. The first portion of fibers includes a plurality of layers of woven fibers. The second portion of fibers includes a plurality of tow-lines of fibers, the plurality of tow-lines cooperate to form a substantially polygonal shape.

In one aspect, the vehicle component is a vehicle header. The vehicle header includes an elongate body extending between a first side and a second side.

In one aspect, the elongate body further includes an infrared (IR) reflector disposed adjacent to a first surface of the elongate body.

In one aspect, the elongate body further includes a plurality of conductive tapes configured to electrically couple the heating element to the external circuit. The plurality of conductive tapes includes copper tapes.

In one aspect, the plurality of conductive tapes includes a first conductive tape and a second conductive tape. The first conductive tape is coupled to the first side and the second conductive tape is coupled to the second side. The elongate body is configured to generate heat between the first side and the second side.

In one aspect, the heating element includes a first heating element and a second heating element. The plurality of tapes includes a first conductive tape, a second conductive tape, a third conductive tape, and a fourth conductive tape. The elongate body further includes a first region, a second region, and a third region. The first region includes the first heating element extending between a first end and a second end. The first conductive tape is coupled to the first end and the second conductive tape is coupled to the second end. The first region is configured to generate heat between the first end and the second end. The second region includes the second heating element extending between a third end and a fourth end. The third conductive tape is coupled to the third end and the fourth conductive tape is coupled to the fourth end. The second region is configured to generate heat between the third end and the fourth end. The third region is disposed between the first region and the second region. The third region is free of the heating element.

In various aspects, the present disclosure provides a vehicle header including an elongate body extending between a first side and a second side. The elongate body includes a polymer matrix, a plurality of fibers in the polymer matrix, and a heating element embedded in the polymer matrix. The heating element is (i) a discrete heating element, (ii) at least a portion of the plurality of fibers, or both (i) and (ii). At least a portion of the elongate body is configured to be coupled to an external circuit to generate heat in the elongate body. At least a second portion of the elongate body has a transparency of greater than or equal to about 0%.

In one aspect, the elongate body further includes a plurality of conductive tapes configured to electrically couple the heating element to the external circuit.

In one aspect, the heating element includes a first heating element and a second heating element. The plurality of conductive tapes includes a first conductive tape, a second conductive tape, a third conductive tape, and a fourth conductive tape. The elongate body includes a first region, a second region, and a third region. The first region includes the first heating element extending between a first end and a second end. The first conductive tape is coupled to the first end and the second conductive tape is coupled to the second end. The first region is configured to generate heat between the first end and the second end. A second region includes the second heating element extending between a third end and a fourth end. The third conductive tape is coupled to the third end and the fourth conductive tape is coupled to the fourth end. The second region is configured to generate heat between the third end and the fourth end. The third region is disposed between the first region and the second region. The third region is free of the heating element.

In one aspect, the first region and the second region have a transparency that is greater than or equal to about 0% to less than or equal to about 75%, and the third region has a transparency that is greater than or equal to about 0% to less than or equal to about 92%.

In one aspect, the heating element includes the discrete heating element. The discrete heating element includes a film. The film is (i) at least partially transparent, (ii) at least partially opaque, or both (i) and (ii).

In various aspects, the present disclosure provides a method of making a vehicle component. The method includes preparing a fiber mat including a first plurality of fibers and a second plurality of fibers. The first plurality of fibers includes a first thermoplastic polymer. The second plurality of fibers includes structural fibers, heating fibers, or both structural fibers and heating fibers. The method further includes forming a fiber mat assembly by stitching the fiber mat to a backing. The backing includes a film. The film includes a second thermoplastic polymer. The method further includes forming a composite by consolidating the fiber mat assembly under heat and pressure. The method further includes forming the vehicle component by injecting a third thermoplastic polymer around at least a portion of the composite.

In one aspect, the vehicle component is a header. The first thermoplastic polymer, the second thermoplastic polymer, and the third thermoplastic polymer include polycarbonate. The second plurality of fibers includes carbon fibers.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5A is a schematic view of another header according to various aspects of the present disclosure;

FIG. 5B is a schematic sectional view of the header of FIG. 5A;

FIG. 6A is a schematic view of another header according to various aspects of the present disclosure;

FIG. 6B is a schematic sectional view of the header of FIG. 6A;

FIG. 7D is a top view of fibers of the transparent inner portion of the header of FIG. 7A;

FIG. 8B is a schematic sectional view of a heated opaque portion of the header of FIG. 8A;

FIG. 8C is a schematic sectional view of an unheated transparent portion of the header of FIG. 8A;

FIG. 9B is a schematic sectional view of a heated opaque portion of the header of FIG. 9A;

FIG. 9C is a schematic sectional view of an unheated transparent portion of the header of FIG. 9A;

FIG. 10B is a schematic sectional view of a heated opaque portion of the header of FIG. 10A;

FIG. 10C is a schematic sectional view of an unheated transparent portion of the header of FIG. 10A;

Corresponding reference numerals indicate corresponding parts throughout the several views of the drawings.

DETAILED DESCRIPTION

Figure 1:
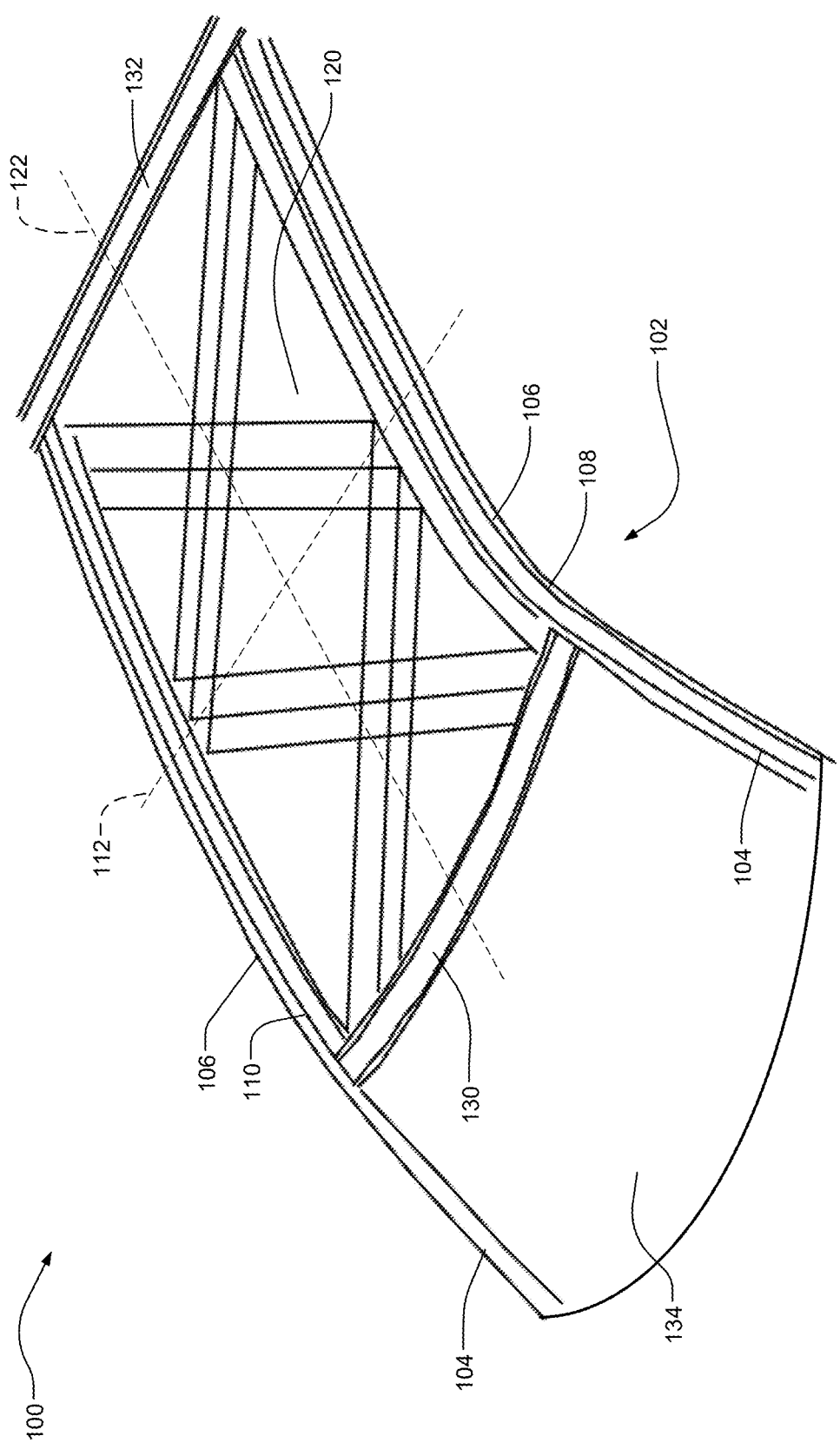
FIG. 1 is a perspective view of a vehicle upper body structure including a header according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Structural assemblies are used in vehicles to provide structural support and/or mounting locations for other vehicle components. A structural assembly for an upper body structure may include multiple upper body components such as a front header, a rear header, a roof, a driver-side roof rail, a passenger-side roof rail, and one or more pairs of structural pillars. The roof may extend substantially rearward of the front header in vehicle and join the driver-side roof rail to the passenger-side roof rail. The front header may join the driver-side roof rail to the passenger-side roof rail. The front header may support both the roof and a windshield and join the roof to the windshield. It is advantageous for an upper body structure to have a high stiffness and strength in local regions near the roof rails and structural pillars, particularly near the joints of the header to the roof rails and the roof to the roof rails.

Upper body assemblies may be constructed from a variety of materials. Certain components, such as headers, are typically opaque. For example, structural components, including vehicle headers, may be constructed from metal, such as steel. In another example, vehicle headers may be constructed from composite materials such as a fiber-reinforced composite material and/or a laminate composite material.

Vehicles are commonly equipped with heating systems to heat various vehicle components and/or a passenger compartment. For example, many vehicles include heated seats, heated steering wheels, heated rear windows, and a passenger compartment heating and cooling system. Upper body components, such as headers, are typically not heated or cooled.

In various aspects, the present disclosure provides a header component for a vehicle upper body structure. The header may be a front vehicle header or a rear vehicle header. The header may be configured to provide structural support, occupant comfort, and/or occupant visibility, and/or shield occupants from rain, snow, ultraviolet (UV) light, infrared (IR) wavelengths, and/or other elements. The header may be constructed from or include a fiber-reinforced composite. The fiber-reinforced composite may include a polymer and a plurality of fibers. The header is thermally compensated with integrated heating elements that are configured to heat the header (e.g., by Joule heating and/or radiant heating). As used herein, configured to heat means that at least a portion of the header is configured to generate heat. In certain aspects, the header may be configured to conduct heat towards the windshield to aid in the defrosting process. In certain aspects, the header may be configured to heat the passenger compartment and/or the windshield. The header may be configured to be heated through heat-conducting fibers, such as heat-conducting structural fibers, and/or a distinct heating element, such as a film. In certain aspects, at least a portion of the header is at least partially transparent. As used herein, transparent means that at least a portion of the header has a transparency of greater than 0%.

Referring to FIG. 1, an upper body structure 100 for a vehicle according to various aspects of the present disclosure is provided. The upper body structure 100 may at least partially define and enclose an upper periphery of a vehicle passenger compartment 102. The upper body structure 100 includes a pair of laterally spaced A-pillars 104 and a pair of laterally spaced roof rails 106. The pair of roof rails 106 may include a driver-side roof rail 108 and a passenger-side roof rail 110. The roof rails 106 may be secured to or integrally formed with the respective A-pillars 104. The roof rails 106 may extend substantially parallel to a longitudinal or fore-aft axis 112 of the vehicle. Alternative vehicle architectures may include additional structural pillars (not shown), such as a pair of B-pillars, a pair of C-pillars, and/or a pair of D-pillars. The pillars, including the A-pillars 104, may extend substantially perpendicularly from the roof rails 106 and may be configured to join the upper body structure 100 to a lower body structure (not pictured), further defining the passenger compartment 102.

A roof 120 may be at least partially disposed between the roof rails 106. The roof 120 may have a generally rectangular shape. Sides of the roof 120 may extend substantially parallel to a lateral or a cross-car axis 122 of the vehicle and substantially parallel to the fore-aft axis 112 of the vehicle.

A front header 130 (also referred to as "the header 130") is at least partially disposed between the roof rails 106. The header 130 may extend substantially orthogonally to the roof rails 106. The header 130 may be configured to couple the driver-side roof rail 108 to the passenger-side roof rail 110. The header 130 may be coupled to the roof rails 108, 110 adjacent to the A-pillars 104. The front header 130 may be configured to couple the roof 120 to a windshield 134. As will be described in greater detail below, the front header 130 is configured to generate heat.

A rear header 132 may be at least partially disposed between the roof rails 106. The rear header 132 may extend substantially orthogonally to the roof rails 106. The rear header 132 may be configured to couple the roof rails 106 adjacent to a rear end of the upper body structure 100.

In certain aspects, as shown in FIG. 1, the upper body structure 100 is free of additional cross-car reinforcement members. However, in certain other aspects, the upper body structure 100 may optionally further include one or more cross-car reinforcement members (not shown). The cross-car reinforcement members may extend substantially orthogonally between the roof rails 106. The cross-car reinforcement members may be spaced longitudinally across the fore-aft axis 112 as needed to provide structural support and/or strength for the upper body structure 100.

Figure 2:
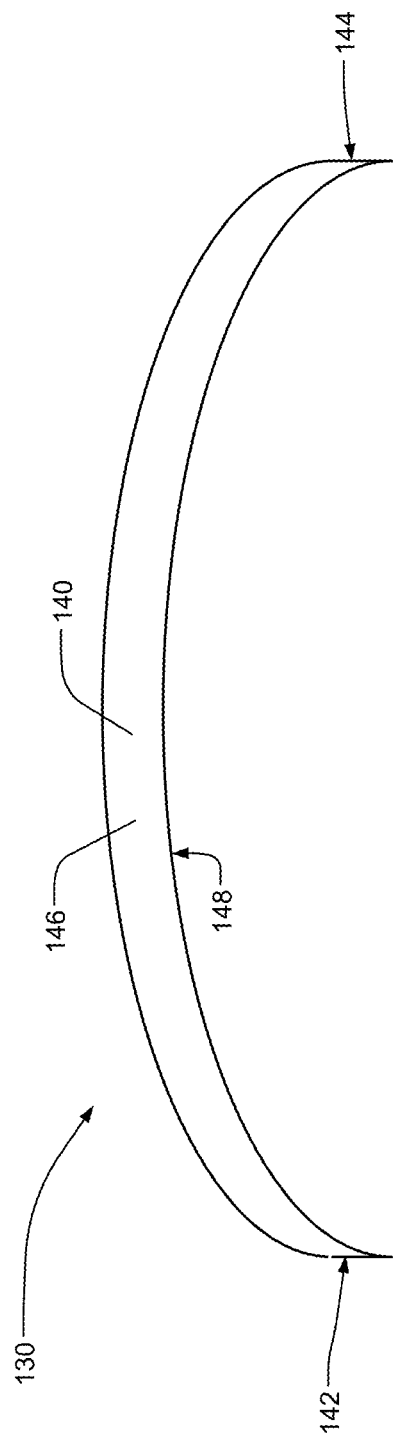
FIG. 2 is a perspective view of the header of FIG. 1 according to various aspects of the present disclosure.

Referring to FIG. 2, the header 130 includes an elongate body 140. The elongate body 140 extends between a first side 142 and a second side 144 (also referred to as "the sides 142, 144"). The sides 142, 144 may be configured to be coupled to the passenger-side roof rail 110 (FIG. 1) and the driver-side roof rail 108 (FIG. 1), respectively. In certain aspects, the header 130 includes a first or top surface 146 and a second or bottom surface 148.

The windshield 134 (FIG. 1) may have a curvature (not shown) as desired to meet the architectural design of the vehicle. The header 130 may have a curvature that is similar to the curvature of the windshield 134. The header 130 may have different geometries (e.g., shape and/or curvature), features (e.g., outer edges and/or formations), and configurations as needed to meet desired mechanical performance and/or aesthetic characteristics of the upper body structure 100.

In various aspects, the stiffness and strength of the header 130 may achieve desired mechanical properties of the upper body structure 100. In certain aspects, the header 130 may be free of additional reinforcement components. In certain aspects, a local tensile strength of the header 130 (a tensile strength in at least one region of the header) may be greater than or equal to about 20 MPa to greater than or equal to about 2400 MPa. In certain aspects, a tensile modulus of the upper body component may be greater than or equal to about 300 GPa to greater than or equal to 500 GPa.

In certain aspects, the header 130 may be substantially opaque, as described below in the discussion accompanying FIGS. 3A-6B. In certain other aspects, a portion of the header 130 may be substantially opaque. In certain aspects, the header 130 may be at least partially transparent (also referred to as "the transparent header") as described below in the discussion accompanying FIGS. 7A-10C.

The header 130 according to various aspects of the present disclosure may include a polymer and a plurality of fibers. In certain aspects, the header 130 is a fiber-reinforced composite. Fiber-reinforced composite headers according to various aspects of the present disclosure may be lighter than metal header components having the same dimensions. Such lighter weight upper body components may improve vehicle fuel efficiency and/or battery range.

The polymer may be a thermoset polymer or a thermoplastic polymer. In certain aspects, the polymer may include a substantially opaque thermoset polymer selected from the group consisting of: an epoxy, a polyurethane (PUR), a vinyl ester, a polyacrylate (acrylic), a polyimide (PI), a bismaleimide (BMI), a phenolic (PF), co-polymers thereof, and combinations thereof. In certain aspects, the polymer may include a substantially transparent thermoset polymer when free of fibers. The substantially transparent thermoset polymer selected from the group consisting of: an epoxy, a PUR, a polyacrylate (acrylic), PI, a PF, co-polymers thereof, and combinations thereof. In certain aspects, the polymer may be a substantially opaque thermoplastic polymer selected from the group consisting of: a polycarbonate (PC), a polymethylmethacrylate, a thermoplastic polyurethane (TPU), a polyethylene terephthalate (PET), a polyamide (PA) (e.g., nylon 6, nylon 66, nylon 12, PA 11, PA 10T/10I/10-12), a polyethylenimine (PEI), a polyamide-imide (PAI), a polyetheretherketone (PEEK), a polyetherketone (PEK), a polyphenylene sulfide (PPS), a polypropylene (PP), a polycarbonate/acrylonitrile butadiene styrene (PC/ABS), a high-density polyethylene (HDPE), a poly(methyl methacrylate)

(PMMA), a polyaryletherketone (PAEK), a polyetherketoneketone (PEKK), co-polymers thereof, and combinations thereof. In certain aspects, the polymer may be a substantially transparent polymer when free of fibers. In certain aspects, the substantially transparent thermoplastic polymer may be selected from the group consisting of: a PC, aPMMA, a TPU, a PET, a PA (e.g., PA 11, PA 10T/10I/10-12), co-polymers thereof, and combinations thereof. In certain aspects, the header 130 may include more than one polymer. In certain aspects, the header 130 may include both a substantially transparent polymer, such as in regions of higher transparency, and a substantially opaque polymer, such as in regions of lower or no transparency.

In certain aspects, the polymer may include a filler. In certain aspects, the polymer may be a tinted polymer. In certain aspects, a tinted polymer includes color pigments in an amount desired to meet the desired aesthetic and/or transparency characteristics of the header 130. Any of the polymers above may include a filler, such as pigment. By way of example, the tinted polymer may be selected from the group consisting of: a PC, a PMMA, co-polymers thereof, and combinations thereof. In certain aspects, a transparent polymer may be tinted to reduce an amount of light that passes through the header, such sunlight that heats the passenger compartment.

In certain aspects, the plurality of fibers (also referred to as "the fibers") may have lengths and/or configurations to meet desired strength, stiffness, and conductive characteristics for the header 130. The header 130 may optionally include more than one fiber configuration to achieve a desired mechanical strength and/or stiffness.

In certain aspects, the plurality of fibers includes a heating fiber (also referred to as "the heating fibers"). The heating fiber may be a structural heating fiber. As used here, a "structural heating fiber" is a fiber having sufficient strength, stiffness, and conductive characteristics desired to achieve the heat generating characteristics of the header 130. Suitable structural heating fibers may include carbon fibers (e.g., carbon black, carbon nanotubes, talc, fibers derived from polyacrylonitrile and/or pitch precursors), or other fibers suitable to conduct and/or generate heat through the elongate body 140 of the header 130.

In certain aspects, the plurality of fibers includes a structural fiber. As used herein, a "structural fiber" is a fiber exhibiting desired strength and stiffness characteristics. The structural fiber may be selected from the group consisting of: carbon fibers, glass fibers (e.g., E-glass, fiber glass, quartz), natural fibers (e.g., flax, ramie, hemp, spider silk, cellulose, cotton), basalt fibers, aramid fibers (e.g., KEVLAR®, polyphenylene benzobisoxazole (PBO)), polyethylene fibers (e.g., high-strength ultra-high molecular weight (UHMW) polyethylene), polypropylene fibers (e.g., high-strength polypropylene), and combinations thereof.

In certain aspects, the structural fiber includes a thermally insulating fiber having a relatively lower heat conductivity. Thermally insulating fibers may be configured to decrease heat transmission across the elongate body 140 of the header 130. Thermally insulating fibers may be selected from the group consisting of: glass fibers (e.g., E-glass, fiber glass, quartz), natural fibers (e.g., flax, ramie, hemp, spider silk, cellulose, cotton), basalt fibers, aramid fibers (e.g., KEVLAR®, polyphenylene benzobisoxazole (PBO)), polyethylene fibers (e.g., high-strength ultra-high molecular weight (UHMW) polyethylene), polypropylene fibers (e.g., high-strength polypropylene), and combinations thereof. Heating fibers, structural fibers, and thermally insulating fibers may be used in combination or alone and configured (e.g., included in a volume percent and/or orientated) as needed to meet the desired structural and heat generating characteristics of the header 130.

The fibers (i.e., heating fibers, structural fibers, insulating fibers, combinations thereof) may be fabricated as woven fabric, continuous random fabric, discontinuous random fibers, chopped random fabric, continuous strand unidirectional plies, oriented chopped strand plies, braided fabric and any combinations thereof. In certain aspects, as described in FIGS. 3A-6B and 8A-10C, all of the fibers may be embroidered into a woven fabric. In certain aspects, the fibers in the woven fabric are extending in both a first or vertical direction and a second or horizontal direction.

In certain aspects, a heating fiber may be woven with a thermoplastic fiber and stitched into a film. In one example, a carbon fiber is comingled with a thermoplastic polycarbonate fiber. The fibers may be stitched into a film (e.g., a polycarbonate film).

In certain aspects, at least a portion of the fibers may be aligned in tow-lines and placed (e.g., by tape) into a geometric shape. In certain aspects, the geometric shape may be a substantially polygonal shape. In certain aspects, the geometric shape may be a hexagonal shape (see, e.g., FIGS. 7A and 7D), although other shapes and geometries are possible. In certain aspects, the header 130 may include both fibers that are embroidered into a woven fabric and fibers that are aligned in tow-lines (see, e.g., FIG. 7A). In certain aspects, the header 130 includes a plurality of layers of fibers, such as a plurality of layers of woven fabric. In certain aspects, the configuration of the fibers is substantially homogeneous across the elongate body 140. In certain other aspects, the header 130 may include a plurality of regions or portions. The configuration of fibers of each region or portion may be the same or different such that the configuration of fibers may vary across the upper body component.

In certain aspects, the header 130 may include a total amount of fibers in an amount greater than or equal to 5 volume percent to less than or equal to about 70 volume percent. In certain aspects, such as when substantially the entire header is configured to generate heat and/or substantially the entire header is opaque, a volume percent, or volume fraction, of fibers may be substantially homogeneous across the elongate body 140 of the header 130. In certain other aspects, the header 130 may include a plurality of regions or portions. The volume percent of fibers of each region or portion may be the same or different such that the volume percent of fibers may vary across the header 130. In certain aspects, regions having a relatively higher volume percent of fibers may have a relatively higher strength and/or stiffness than regions having a lower volume percent of fibers. In certain aspects, a region including a higher volume percent of fibers may include the fibers in an amount greater than or equal to 40 volume percent. In certain aspects, a region including a higher volume percent of fibers may include the fibers in an amount greater than or equal to 50 volume percent. In certain aspects, regions having a relatively lower volume percent of fibers may have a relatively lower strength and/or stiffness than regions having a higher volume percent of fibers. In certain aspects, regions having a relatively lower volume percent of fibers may include the fibers in an amount less than or equal to 20 volume percent. In certain aspects, the strength of each region or portion may be the same or different such that the strength of the header 130 may vary across the elongate body 140.

In various aspects, the strength, conductivity (i.e., heat generating characteristics), and transparency of the header 130 may be tailored through polymer selection, fiber selection, and/or fiber configuration. In certain aspects, the heat generating characteristics of the header 130 may be tailored by including fibers having a desired electrical resistivity. In certain aspects, each region or portion may include the same polymer and/or fiber. In certain other aspects, each region or portion may include a different polymer and/or fiber. In certain aspects, a region or portion may include a polymer that is substantially free of fibers (e.g., when low heat generation and/or a high transparency is desired). The polymer that is substantially free of fibers may be the same or different from the polymer of a region including both the polymer and fibers. Any combination of polymers including any combination of fibers may be utilized and configured to provide desired strength, conductivity, and transparency characteristics of the header.

According to various aspects of the present disclosure, at least a portion of the header 130 is configured to generate heat (i.e., one or more regions of the header are configured to generate heat). In certain aspects, the header 130 further includes a heating element (e.g., fibers and/or a distinct heating element) embedded in the polymer matrix. In certain aspects, the header 130 may include multiple regions having tailored heat generating characteristics. For example, some regions that are expected to provide heat to the passenger compartment may include the heating element. Regions that are not expected to provide heat to the passenger compartment may be free of the heating element.

In certain aspects, the heating element may include a discrete heating element, such as a heating film, as described in greater detail below in the discussion accompanying FIGS. 6A-6B, 9A-9B, and 10A-10B. In certain aspects, the heating film includes conductive material. The heating film may define a substantially planar form, such as in a single layer sheet or a multilayer sheet. The heating film may include a sheet consisting essentially of a conductive material or a sheet including conductive material dispersed in and/or embedded in a polymer.

A polymer of the heating film (i.e., the polymer of the discrete heating element) may be the same as or different from the polymer of the header 130. In certain aspects, the heating film includes a polymer nanocomposite film. In certain aspects, the polymer nanocomposite film is a commercially available polymer nanocomposite film. The heating film may include material selected from the group consisting of: indium tin oxide (ITO) (e.g., an ITO sheet), carbon nanotubes (e.g., as a single layer or embedded in a polymer), graphene (e.g., a sheet or layer and/or embedded in a polymer), silver (e.g., silver nanowire, a sheet or layer, and/or embedded in a polymer), or combinations thereof.

In certain aspects, the heating element may include a single layer having a thickness that is greater than or equal to about 0.1 nanometer (nm) to less than or equal to about 1 millimeter (mm). In certain aspects, such as when the heating element includes a single layer of ITO, the heating element may have a thickness that is less than or equal to 1 mm. In certain aspect, the heating element including ITO has a thickness that is greater than or equal to about 10 nm to less than or equal to about 500 nm. In certain aspects, such as when the heating element includes a single layer of graphene sheet, the heating element may have a thickness that is greater than or equal to about 0.3 nm to less than or equal to about 0.4 nm. In certain aspects, such as when the heating element includes graphene embedded in a polymer (e.g., the graphene is embedded as a sheet or as ribbons, particles, and/or flakes), the heating element may have a thickness that is greater than or equal to about 100 nm to less than or equal to about 1 mm. In certain aspects, such as when the heating element includes carbon nanotubes and/or silver nanowires embedded in a polymer, the heating element may have a thickness that is greater than or equal to about 100 nm to less than or equal to about 1 mm. In certain aspects, the header 130 may include a heating element that includes a multi-layer film. In certain aspects, the heating element including a multi-layer film may have a thickness that is greater than or equal to about 0.01 micrometer ($\mu$m) to less than or equal to about 100 $\mu$m.

In certain aspects, the header 130 may include more than one heating film such as greater than or equal to two heating films, optionally greater than or equal to three heating films, optionally greater than or equal to five heating films, optionally greater than or equal to seven heating films, or optionally greater than or equal to ten heating films. In certain aspects, the heating film may be substantially opaque. In certain other aspects, the heating film may be substantially transparent.

In certain aspects, the heating element includes at least a portion of the plurality of fibers (e.g., when the plurality of fibers includes a heating fiber, such as carbon fiber, having conductive characteristics), as will be described in greater detail below in the discussion accompanying FIGS. 3A-5B, 7A-8B, and 10A-10C. That is, all or a portion of the plurality of fibers may be configured to conduct and/or generate heat. In certain aspects, the heating element may include a combination of both a discrete heating element and at least a portion of the plurality of fibers, as will be described in greater detail below in the discussion accompanying FIGS. 10A-10C. In certain aspects, the heating element is configured to be coupled to an external circuit to generate heat in at least a portion of the header 130.

In certain aspects, the header 130 includes a plurality of tapes (also referred to as "the tapes"), as described in greater detail below in the discussion accompanying FIGS. 3A-10C. In certain aspects, the tapes may be fiber-reinforcing tapes that are configured to structurally reinforce the fibers to achieve the desired strength and/or stiffness characteristics of the header 130. In certain aspects, the tapes may include conductive tapes. The conductive tapes may be configured to electrically couple the heating element to the external circuit. The conductive tapes may include a metal foil and an adhesive layer directly coupled to the metal foil. The tapes may include copper tapes, other suitable tapes having a high conductivity, or combinations thereof.

In certain aspects, the header 130 further includes a conductive paste, alone or in combination with the conductive tapes. In certain aspects, the conductive paste may further reinforce the structural fibers. In certain aspects, the conductive paste may cooperate with the conductive tapes to electrically couple the heating element to the external circuit.

In certain aspects, the header 130 may include an infrared (IR) reflector, as described in greater detail below in the discussion accompanying FIGS. 3A-10C. The IR reflector may be at least partially disposed on the first surface 146 of the header 130 (see, e.g., the IR reflector 312 of FIGS. 3A-3B). The IR reflector may be configured to prevent IR wavelengths (e.g., IR light from the sun) from passing through the windshield 134 to the body 140 of the header 130. In certain aspects, the IR reflector may include materials selected from the group consisting of: chrome finishes, aluminum foil, multilayered film, or combinations thereof. In certain aspects, the IR reflector may have a thickness that is greater than or equal to about 100 nm to less than or equal to about 5 $\mu$m. In certain aspects, the header 130 may include more than one IR reflector, such as greater than or equal to two IR reflectors, optionally greater than or equal to three IR reflectors, optionally greater than or equal to five IR reflectors, optionally greater than or equal to seven IR reflectors, or optionally greater than or equal to ten IR reflectors. In certain other aspects, the header 130 may be free of an IR reflector.

In various aspects, when power (e.g., an electrical current) is applied from the external circuit, a current flows through the heating element. The current is subject to a resistance from the heating element. As the current flows through the heating element, the resistance in the heating element produces thermal energy. Higher levels of resistance produce a higher amount of thermal energy in the presence of current. As the thermal energy in the body 140 increases, the material temperature of the body 140 increases and the body 140 of the header 130 generates heat. As the time the power source is applied increases, the temperature of the header 130 generally increases. In certain aspects, at least a portion of the header 130 may be configured to be heated to a temperature that is greater than or equal to about 40° F. to less than or equal to about 75° F. In certain aspects, the header may be configured to be heated to a temperature that is greater than or equal to about 45° F., optionally greater than or equal to about 50° F., optionally greater than or equal to about 55° F., optionally greater than or equal to about 60° F., optionally greater than or equal to about 65° F., or optionally greater than or equal to about 70° F. In certain aspects, the header may be configured to be heated to a temperature that is less than or equal to about 65° F., optionally less than or equal to about 60° F., optionally less than or equal to about 55° F., optionally less than or equal to about 50° F., or optionally less than or equal to about 45° F.

Figure 3A:
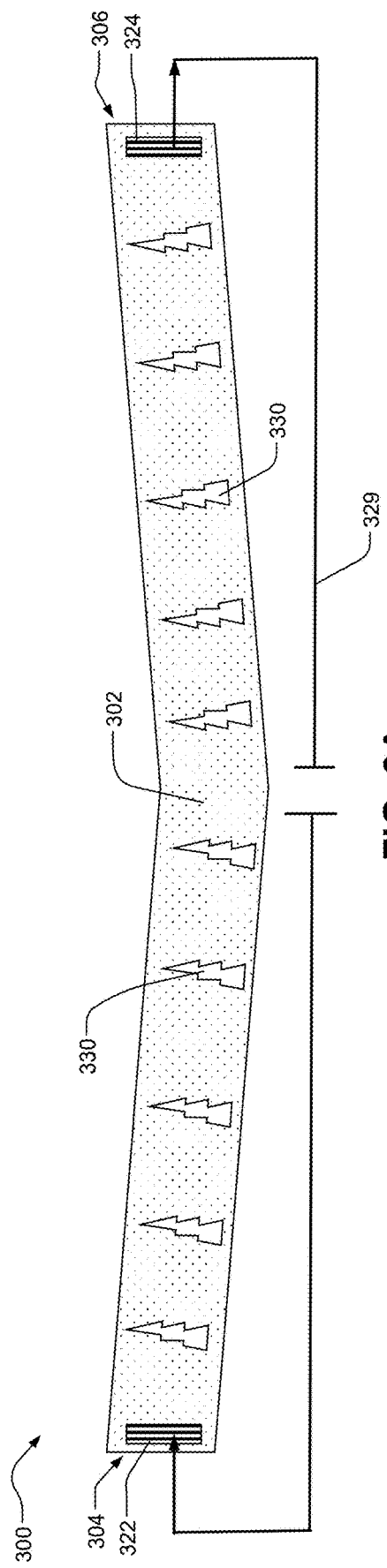
FIG. 3A is a schematic view of a header according to various aspects of the present disclosure.
Figure 3B:
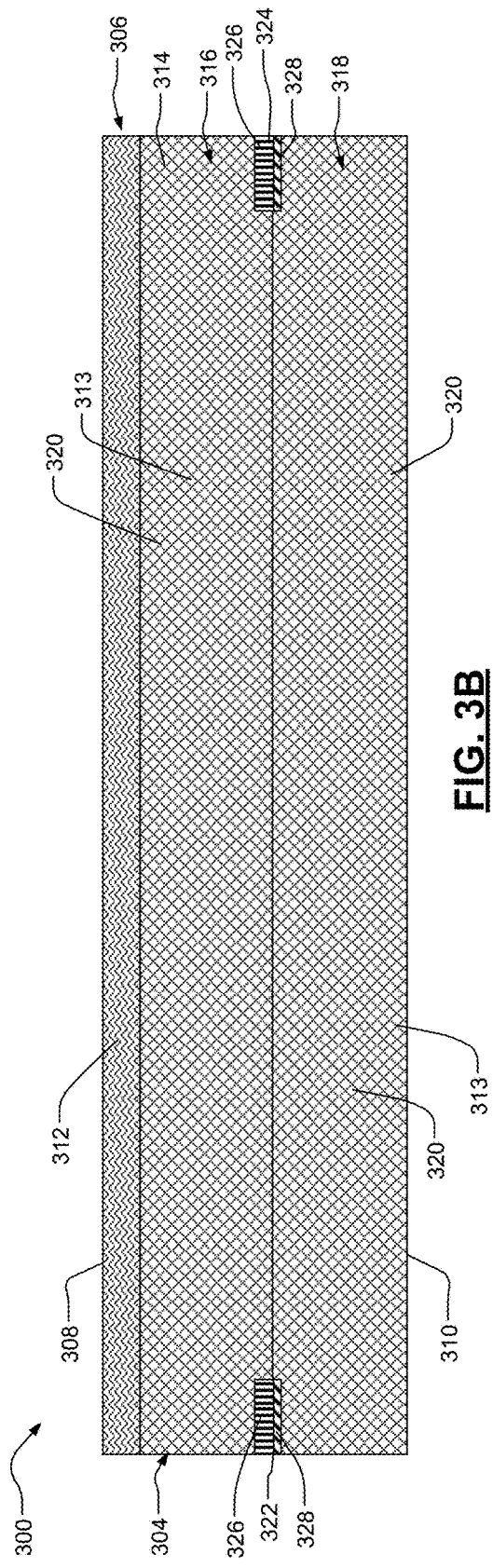
FIG. 3B is a schematic sectional view of the header of FIG. 3A.

A header according to various aspects of the present disclosure may be configured to be heated across substantially its entire body via heating fibers. With reference to FIGS. 3A-3B, a header 300 of an upper body structure, which may be similar to the upper body structure 100 of FIG. 1 except for the header 300, according to various aspects of the present disclosure is provided. The header 300 may be the same as the header 130 of FIGS. 1-2 unless otherwise described below. The header 300 includes an elongate body 302 (also referred to as "the body 302"). The body 302 extends between a first side 304 and a second side 306 opposite the first side 304 (also referred to as "the sides, 304, 306"). The header 300 includes a first surface 308 (e.g., a top surface), and a second surface 310 (e.g., a bottom surface). In certain aspects, as best shown in FIG. 3B, an IR reflector 312 is disposed adjacent to the first surface 308.

In certain aspects, the header 300 includes a polymer 313 (FIG. 3B). The polymer 313 may include an opaque polymer. The polymer 313 may be distributed throughout the body 302 of the header 300.

In certain aspects, the header 300 includes a plurality of layers 314 (FIG. 3B). In certain aspects, all or a portion of the layers may be integrally formed. In certain aspects, all or a portion of the layers may be integrally formed with the same polymer 313. The header 300 may include a first portion 316 of the layers 314 and a second portion 318 of the layers 314. Each of the layers 314 includes a of a plurality of fibers 320 (FIG. 3B). In certain aspects, the fibers 320 may include heating fibers. In certain aspects, the heating fibers may be structural heating fibers that provide structural support in addition to being configured to conduct and/or generate heat. In certain aspects, at least a portion of the heating fibers are configured to be a heating element of the header 300. In one example, all of the fibers are structural heating fibers, such as conductive carbon fibers. In another example, conductive heating fibers are woven together with non-conductive structural fibers.

In certain aspects, in each of the layers 314, the fibers 320 may be arranged in a single layer or multiple layers. The fibers 320 may be homogeneously distributed across the body 302, as shown, or alternatively distributed non-homogeneously depending on the desired strength and/or heating characteristics of the header 300.

In certain aspects, the header 300 includes a plurality of tapes including a first tape 322 and a second tape 324. Each of the tapes 322, 324 may include a metal foil 326 (e.g., a copper foil). In certain aspects, an adhesive 328 is directly coupled to the metal foil and is configured to couple the tapes 322, 324 to the header 300. In certain aspects, the tapes 322, 324 have an average thickness that is greater than or equal to about 100 µm, such as greater than or equal to about 150 µm, or optionally greater than or equal to about 200 µm.

In certain aspects, the tapes 322, 324 are at least partially disposed between the first portion 316 of the layers 314 and the second portion 318 of the layers 314, as shown in FIG. 3B. In certain other aspects, the tapes 322, 324 may be at least partially disposed in the first portion 316 of the layers 314, (e.g., relatively closer to the first surface 308). In certain other aspects, the tapes 322, 324 may be at least partially disposed in the second portion 318 of the layers 314 (e.g., relatively closer to the second surface 310). In certain aspects, the header 300 may include additional tapes such that tapes are disposed in both the first portion 316 of the layers 314 and the second portion 318 of the layers 314. The placement of the tapes 322, 324 in the header 300 may be modified to meet the desired structural and flexural characteristics of the header 300.

In certain aspects, the first tape 322 is disposed in the header 300 adjacent to the first side 304. In certain aspects, the second tape 324 is disposed in the header 300 adjacent to the second side 306. In certain aspects, the tapes 322, 324 are embedded in the header 300 and at least partially disposed between the layers 314 at a distance that may be greater than or equal to about 1 millimeter (mm) from the respective sides 304, 306.

In certain aspects, the tapes 322, 324 are configured to electrically couple the fibers 320 to an external circuit 329. When a current is applied to the external circuit 329, the fibers 320 create a conductive path (e.g., a current) having an electrical resistance between the first tape 322 and the second tape 324. The resistance generates thermal energy which produces heat 330 (FIG. 3A). In other words, when an external power is applied to the header 300 at the tapes 322, 324, the electrical resistance of the fibers 320 generates heat 330 along the body 302 between the first tape 322 and the second tape 324. In certain aspects, the header 300 is configured to generate heat 330 through the body 302 between the first side 304 and the second side 306 (i.e., heat is generated across substantially the entire header). The local area and amount of heat generated may be tailored by modifying the tape configuration (e.g., placement of tapes), heating element configuration (e.g., the volume, resistance, and/or conductivity of the structural heating fibers) to achieve the desired structural and heat generating characteristics of the header 300.

Figure 4A:
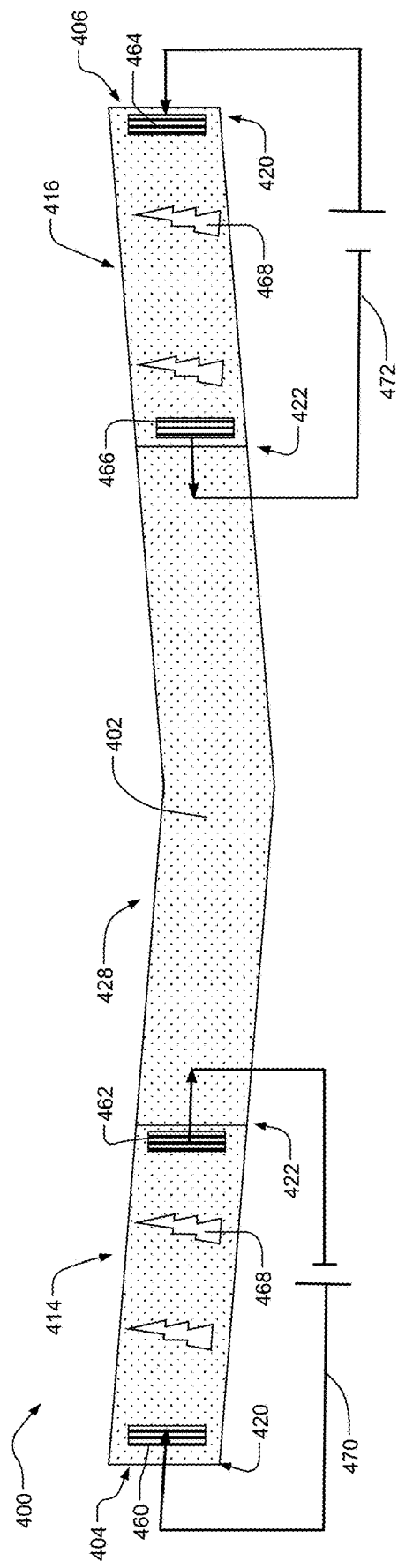
FIG. 4A is a schematic view of another header according to various aspects of the present disclosure.
Figure 4B:
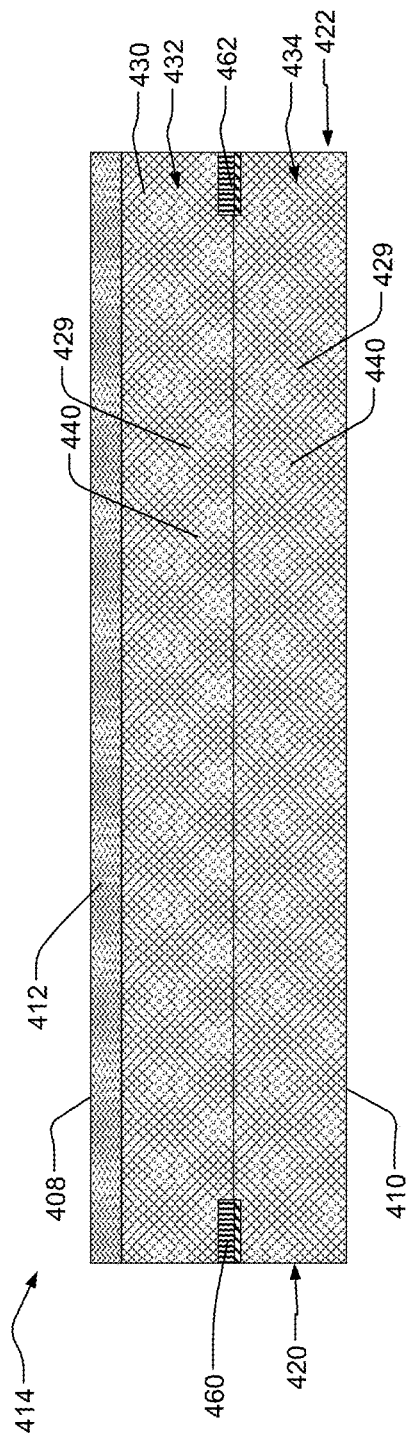
FIG. 4B is a schematic sectional view of a heated outer portion of the header of FIG. 4A.
Figure 4C:
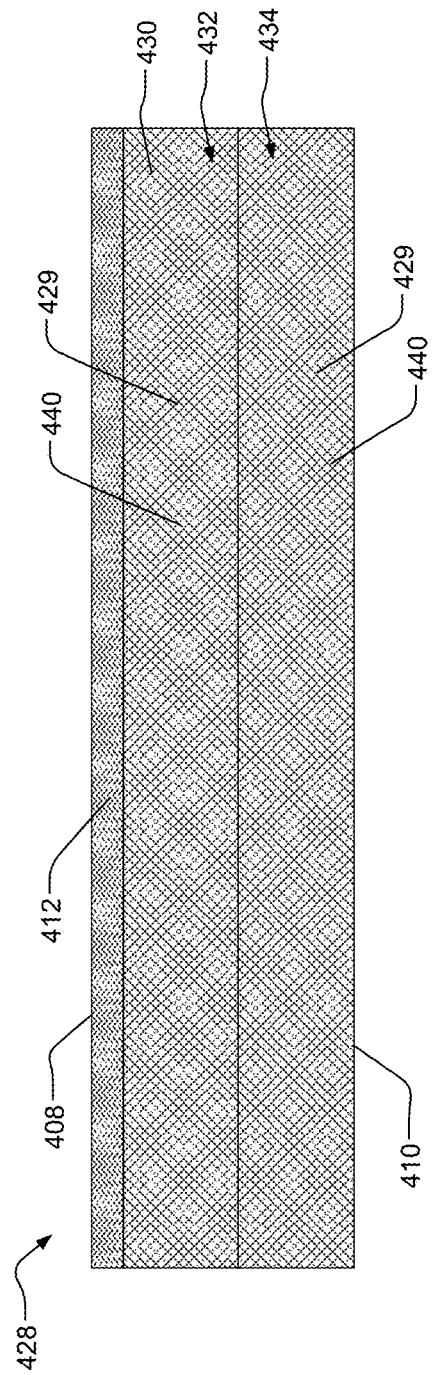
FIG. 4C is a schematic sectional view of an unheated inner portion of the header of FIG. 4A.

A header according to various aspects of the present disclosure may be configured to be heated across one or more regions or portions of its body, which may be less than the entire body, via heating fibers. With reference to FIGS. 4A-4C, a header 400 of an upper body structure, which may be similar to the upper body structure 100 of FIG. 1 except for the header 400, according to various aspects of the present disclosure, is provided. The header 400 may be the same as the header 300 of FIGS. 3A-3B unless otherwise described below. The header 400 includes an elongate body 402. The elongate body 402 extends between a first side 404 and a second side 406 opposite the first side 404 (also referred to as "the sides, 404, 406"). The header 400 includes a first surface 408 and a second surface 410. In certain aspects, as best shown in FIGS. 4B-4C, an IR reflector 412 is disposed adjacent to the first surface 408.

In certain aspects, the header 400 may include one or more regions or portions, such as a first outer region 414 and a second outer region 416 (FIG. 4A) (also referred to as "the outer regions 414, 416"). Each of the outer regions 414, 416 may include a first or outer end 420 and a second or inner end 422. The first end 420 of each of the outer regions 414, 416 may include the first side 404 and the second side 406, respectively. In certain aspects, the header 400 may include an inner region 428 that is disposed between the second end 422 of the first outer region 414 and the second end 422 of the second outer region 416.

In certain aspects, the header 400 includes a polymer 429 (FIGS. 4B-4C). The polymer 429 may include an opaque polymer. In certain aspects, the outer regions 414, 416 and the inner region 428 may be integrally formed with the same polymer 429. In certain other aspects, the polymer 429 may include more than one polymer, such as a first polymer in the outer regions 414, 416 and a second polymer in the inner region 428.

In certain aspects, the header 400 includes a plurality of layers 430 (FIGS. 4B-4C). The header 400 may include a first portion 432 of the layers 430 and a second portion 434 of the layers 430. In certain aspects, all or a portion of the layers may be integrally formed. In certain aspects, all or a portion of the layers may be integrally formed with the same polymer 429. Each of the layers 430 includes a of a plurality of fibers 440 (FIGS. 4B-4C). The fibers 440 may be the same as or similar to the fibers 320 of FIGS. 3A-3B.

In certain aspects, the header 400 includes a plurality of tapes including a first tape 460, a second tape 462, a third tape 464, and a fourth tape 466 (also collectively referred to as "the tapes 460, 462, 464, 466"). The tapes 460, 462, 464, 466 may be the same as or similar to the tapes 322, 324 of FIGS. 3A-3B unless otherwise described below. In certain aspects, as shown in FIG. 4B, the first outer region 414 includes the first tape 460 disposed in the header 400 adjacent to the first end 420 of the first outer region 414 and the second tape 462 disposed in the header 400 adjacent to the second end 422 of the first outer region 414. The third tape 464 may be disposed in the header 400 adjacent to the first end 420 of the second outer region 416 and the fourth tape 466 may be disposed in the header 400 adjacent to the second end 422 of the second outer region 416. In certain aspects, as best shown in FIG. 4C, the inner region 428 may be substantially free of tapes.

The first outer region 414 may be configured to generate heat 468 (FIG. 4A) between the first tape 460 and the second tape 462 when a current is applied to a first external circuit 470. Similarly, the second outer region 416 may be configured to generate heat 468 between the third tape 464 and the fourth tape 466 when a current is applied to a second external circuit 472. In certain aspects, the inner region 428 is not configured to generate heat. Although the header 400 is configured to generate heat 468 in the outer regions 414, 416, other headers may include different or additional regions configured to generate heat, such as by different or additional tape placement, heating fiber inclusion, and or external circuit connectivity.

A header according to various aspects of the present disclosure including heating fibers and non-heated structural fibers may be configured to be heated across substantially its entire body via heating fibers. With reference to FIGS. 5A-5B, a header 500 of an upper body structure, which may be similar to the upper body structure 100 of FIG. 1 except for the header 500, according to various aspects of the present disclosure, is provided. The header 500 may be the same as the header 300 of FIGS. 3A-3B unless otherwise described below. The header 500 includes an elongate body 502. The elongate body 502 extends between a first side 504 and a second side 506 opposite the first side (also referred to as "the sides, 504, 506"). The header 500 includes a first surface 508 and a second surface 510. In certain aspects, as best shown in FIG. 5B, an IR reflector 512 is disposed adjacent to the first surface 508.

In certain aspects, the header 500 includes a polymer 513 (FIG. 5B). The polymer 513 may include an opaque polymer. The polymer 513 may be distributed throughout the body 502 of the header 500.

In certain aspects, the header 500 includes a plurality of layers 514 (FIG. 5B). The header 500 may include a first portion 516 of the layers 514, a second portion 517 of the layers 514, a third portion 518 of the layers 514, and a fourth portion 519 of the layers 514. In certain aspects, all or a portion of the layers 514 may be integrally formed. In certain aspects, all or a portion of the layers 514 may be integrally formed with the same polymer 513. Each of the layers 514 includes a of a plurality of fibers 520 (FIG. 5B). The fibers 520 may include a first portion 522 and a second portion 524. In certain aspects, the first portion 522 of the fibers 520 may be the same as or similar to the fibers 320 of FIGS. 3A-3B. The first portion 522 of the fibers 520 may be configured to be a heating element. In certain aspects, the second portion 524 of the fibers 520 may include structural fibers. In certain aspects, the structural fibers need not be heating fibers.

In certain aspects, the second portion 517 of the layers 514 and the third portion 518 of layers 514 include the first portions 522 of fibers 520 (i.e., heating fibers). In certain aspects, the first portion 516 of layers 514 and the fourth portion 519 of layers 514 include the second portions 524 of fibers 520 (i.e., structural fibers). In certain aspects, the first portions 522 of fibers 520 are disposed between the second portions 524 of fibers 520.

In certain aspects, the header 500 includes a plurality of tapes including a first tape 530 and a second tape 532. The tapes 530, 532 may be the same as or similar to the tapes 322, 324 of FIGS. 3A-3B unless otherwise described below. In certain aspects, the first tape 530 is disposed in the header 500 adjacent to the first side 504. In certain aspects, the second tape 532 is disposed in the header 500 adjacent to the second side 506. In certain aspects, the tapes 530, 532 are embedded in the polymer 513 of the header 500 and at least partially disposed between the second portion 517 of layers 514 and the third portion 518 of layers 514 at the respective sides 504, 506. The tapes 530, 532 may be coupled to the first portion 522 of the fibers 520 (i.e., the tapes 530, 532 are coupled to the heating fibers). In certain aspects, the tapes 530, 532 are directly coupled to the heating fibers. In certain aspects, when a current is applied to an external circuit 540, the header 500 is configured to generate heat 550 (FIG. 5A) between the first side 504 and the second side 506 (i.e., heat is generated across substantially the entire header).

A header according to various aspects of the present disclosure may be configured to be heated across substantially its entire body via a discrete heating element. With reference to FIGS. 6A-6B, a header 600 of an upper body structure, which may be similar to the upper body structure 100 of FIG. 1 except for the header 600, according to various aspects of the present disclosure, is provided. The header 600 may be the same as the header 300 of FIGS. 3A-3B unless otherwise described below. The header 600 includes an elongate body 602. The elongate body 602 extends between a first side 604 and a second side 606 (also referred to as "the sides, 604, 606"). The header 600 includes a first surface 608 and a second surface 610. In certain aspects, as best shown in FIG. 6B, an IR reflector 612 is disposed adjacent to the first surface 608.

In certain aspects, the header 600 includes a polymer 613 (FIG. 6B). The polymer 613 may include an opaque polymer. The polymer 613 may be distributed throughout the body 602 of the header 600.

In certain aspects, the header 600 includes a plurality of layers 614 (FIG. 6B). The layers 614 may include a first portion 616 of the layers 614 and a second portion 617 of the layers 614. In certain aspects, all or a portion of the layers 614 may be integrally formed. In certain aspects, all or a portion of the layers 614 may be integrally formed with the same polymer 613. The first portion 616 of the layers 614 and the second portion 617 of the layers 614 may include a of a plurality of fibers 620 (FIG. 6B). In certain aspects, the fibers 620 may be the same as or similar to the second portion 524 of the fibers 520 of FIGS. 5A-5B (i.e., the fibers 620 may be non-heating, structural fibers).

In certain aspects, the header 600 includes a heating element 622. The heating element 622 may be a discrete heating element. In certain aspects, the heating element 622 is configured to be coupled to an external circuit 624 to generate heat 626 (FIG. 6A) in the elongate body 602. In certain aspects, the heating element 622 includes a heating film.

In certain aspects, the header 600 includes a plurality of tapes including a first tape 630 and a second tape 632. The tapes 630, 632 may be the same as or similar to the tapes 322, 324 of FIGS. 3A-3B unless otherwise described below. In certain aspects, the first tape 630 is disposed in the header 600 adjacent to the first side 604. In certain aspects, the second tape 632 is disposed in the header 600 adjacent to the second side 606. In certain aspects, the conductive tapes 630, 632 are embedded in the header 600 and coupled to the heating element 622. In certain aspects, the tapes 630, 632 are directly coupled to at least a portion of the heating element 622. In certain aspects, when a current is applied to the external circuit 624, the header 600 is configured to generate heat 626 between the first end 604 and the second end 606 (i.e., heat is generated across substantially the entire header).

In various aspects, the present disclosure provides a header that is at least partially transparent, as will be described in greater detail below in the discussions accompanying FIGS. 7A-10C. In various aspects, the transparent header improves occupant visibility compared to a substantially opaque header. At least a portion of the transparent header (or optionally substantially the entire transparent header) may have a transparency, or average light transmittance, of greater than or equal to about 4% to less than or equal to about 99% or optionally greater than or equal to about 50% to less than or equal to about 99%. In certain aspects, the portion may have a transparency of greater than or equal to about 4%, optionally greater than or equal to about 10%, optionally greater than or equal to about 15%, optionally greater than or equal to about 20%, optionally greater than or equal to about 25%, optionally greater than or equal to about 30%, optionally greater than or equal to about 35%, optionally greater than or equal to about 40%, optionally greater than or equal to about 45%, optionally greater than or equal to about 50%, optionally greater than or equal to about 55%, optionally greater than or equal to about 60%, optionally greater than or equal to about 65%, optionally greater than or equal to about 70%, optionally greater than or equal to about 75%, optionally greater than or equal to about 80%, optionally greater than or equal to about 85%, optionally greater than or equal to about 90%, or optionally greater than or equal to about 95%. In certain aspects, the transparency is less than or equal to about 100%, optionally less than or equal to about 90%, optionally less than or equal to about 80%, optionally less than or equal to about 70%, optionally less than or equal to about 60%, optionally less than or equal to about 50%, optionally less than or equal to about 40%, optionally less than or equal to about 30%, optionally less than or equal to about 20%, or optionally less than or equal to about 10%.

In certain aspects, the header may include multiple regions having tailored strengths, heat conducting characteristics, and transparencies. For example, regions that are expected to experience higher loads may have high strengths (e.g., near the header and roof rail joints and/or pillar joints) and a higher volume percent of fibers. Regions that are expected to experience lower loads (e.g., near a centerline of the header) may include a transparent polymer and have reduced fiber volume percent or be substantially free of fibers. In certain aspects, regions having a higher volume percent of fibers and higher strength are generally more opaque than regions having a lower volume percent of fibers and lower strength, as will be described in greater detail below in the discussions accompanying FIGS. 8A-10C.

Figure 7A:
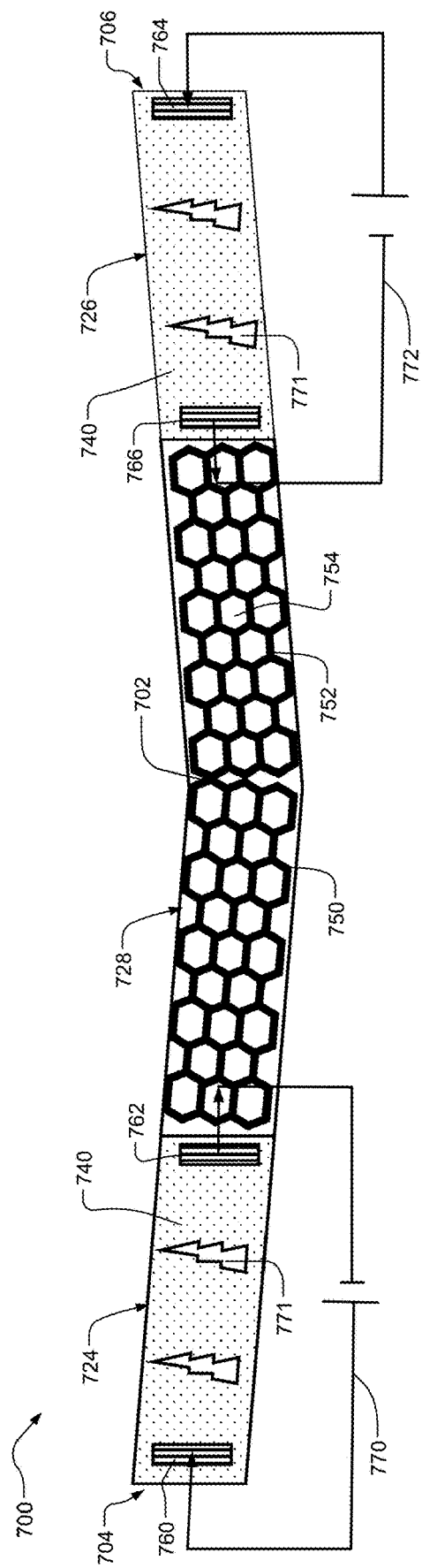
FIG. 7A is a schematic view of another header according to various aspects of the present disclosure.
Figure 7B:
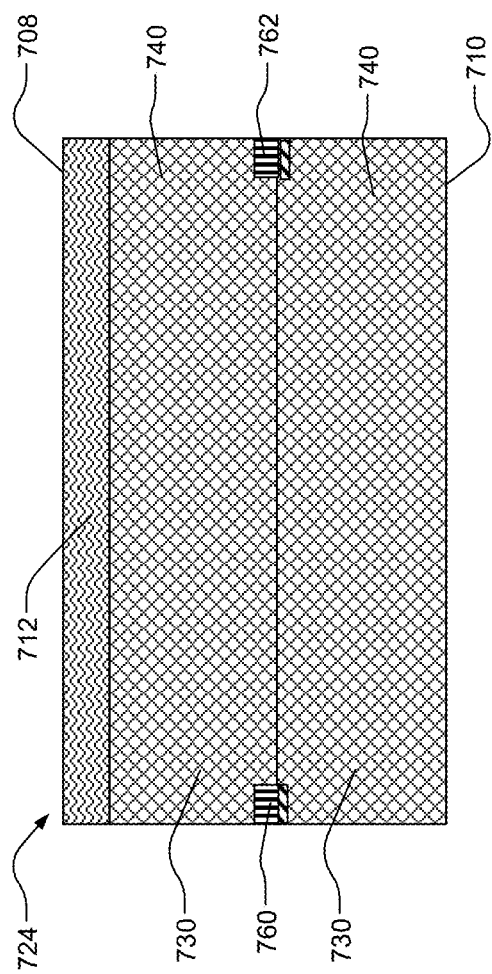
FIG. 7B is a schematic sectional view of an opaque outer portion of the header of FIG. 7A.
Figure 7C:
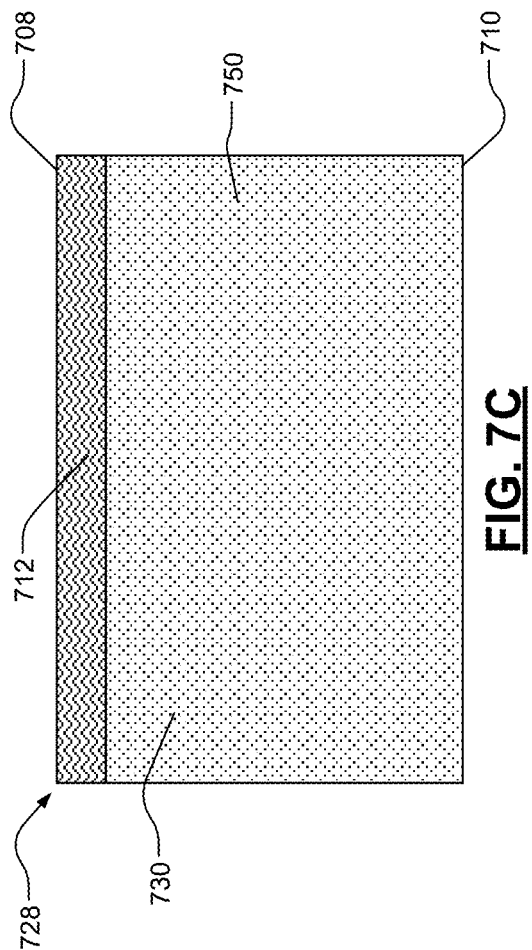
FIG. 7C is a schematic sectional view of a transparent inner portion of the header of FIG. 7A.

A header according to various aspects of the present disclosure may be configured to be heated across one or more regions or portions of its body, which may be less than the entire body, via heating fibers. In certain aspects, at least a portion of the header is at least partially transparent. With reference to FIGS. 7A-7C, a header 700 of an upper body structure, which may be similar to the upper body structure 100 of FIG. 1 except for the header 700, according to various aspects of the present disclosure, is provided. The header 700 may be the same as the header 400 of FIGS. 4A-4C unless otherwise described below. The header 700 includes an elongate body 702. The elongate body 702 extends between a first side 704 and a second side 706 (also referred to as "the sides, 704, 706"). The header 700 includes a first surface 708 and a second surface 710. In certain aspects, as best shown in FIGS. 7B-7C, an IR reflector 712 is disposed adjacent to the first surface 708.

In certain aspects, the header 700 may include one or more regions, such as a first outer region 724 and a second outer region 726 (also referred to as "the outer regions 724, 726"). In certain aspects, the header 700 may include an inner region 728 that is disposed between the first outer region 724 and the second outer region 726.

In certain aspects, the header 700 includes a polymer 730 (FIGS. 7B-7C). The polymer 730 may include a transparent polymer. In certain aspects, the outer regions 724, 726 and the inner region 728 may be integrally formed with the same polymer 730. In certain other aspects, the polymer 730 may include more than one polymer, such as a first polymer in the outer regions 724, 726 and a second polymer in the inner region 728. The first polymer in the outer regions 724, 726 may be substantially opaque. The second polymer in the inner region 728 may be substantially transparent.

In certain aspects, the outer regions 724, 726 are the same as or similar to the outer regions 424, 426 of FIGS. 4A-4B unless otherwise described below. As best shown in FIG. 7B, both the first outer region 724 and the second outer region 726 (FIG. 7A) may include a first plurality of fibers 740 that are the same as or similar to the fibers 320 of FIGS. 3A-3B and the fibers 420 of FIGS. 4A-4C. In certain aspects, the first fibers 740 may include heating fibers, which may be structural heating fibers, such as carbon fibers. In certain aspects, the outer regions 724, 726 may be substantially opaque.

With reference to FIG. 7C, the inner region 728 includes a second plurality of fibers 750. In certain aspects, the second fibers 750 may be heating fibers (e.g., structural heating fibers such as carbon fibers). In certain other aspects, the second fibers 750 may be structural fibers (e.g., basalt fibers, glass fibers, and/or aramid fibers). The second fibers 750 may form a plurality of tow-lines 752 that are placed locally (e.g., by tape) into a geometric formation, such as a plurality of closed curves defining open inner areas. In certain aspects, as best shown in FIG. 7D, the tow-lines 752 may form a plurality of substantially hexagonal shapes. However, the fibers may be arranged in different or additional patterns defining open regions, such as circles, triangles, squares, diamonds, trapezoids, pentagons, heptagons, octagons, and other polygons. In certain aspects, the placement of the second fibers 750 on the tow-lines 752 may form a plurality of inner areas 754 that are substantially free of fibers. In certain aspects, the inner areas 754 may be substantially transparent. In certain aspects, the inner region 728 is at least partially transparent.

In certain aspects, the header 700 includes a plurality of tapes including a first tape 760, a second tape 762, a third tape 764, and a fourth tape 766. The tapes 760, 762, 764, 766 may be the same as or similar to the tapes 440, 442, 444, 446 of FIGS. 4A-4C unless otherwise described below. When a current is applied to a first external circuit 770, the first outer region 724 may be configured to generate heat 771 (FIG. 7A) between the first tape 760 and the second tape 762. Similarly, when a current is applied to a second external circuit 772, the second outer region 726 may be configured to generate heat 771 between the third tape 764 and the fourth tape 766.

In certain aspects, such as when the second fibers 750 include heating fibers, the inner region 728 may be configured to generate heat locally along the tow-lines 752 (not shown). In certain other aspects, such as when the second fibers 750 include structural fibers, the inner region 728 may be free of heat generating characteristics.

Figure 8A:
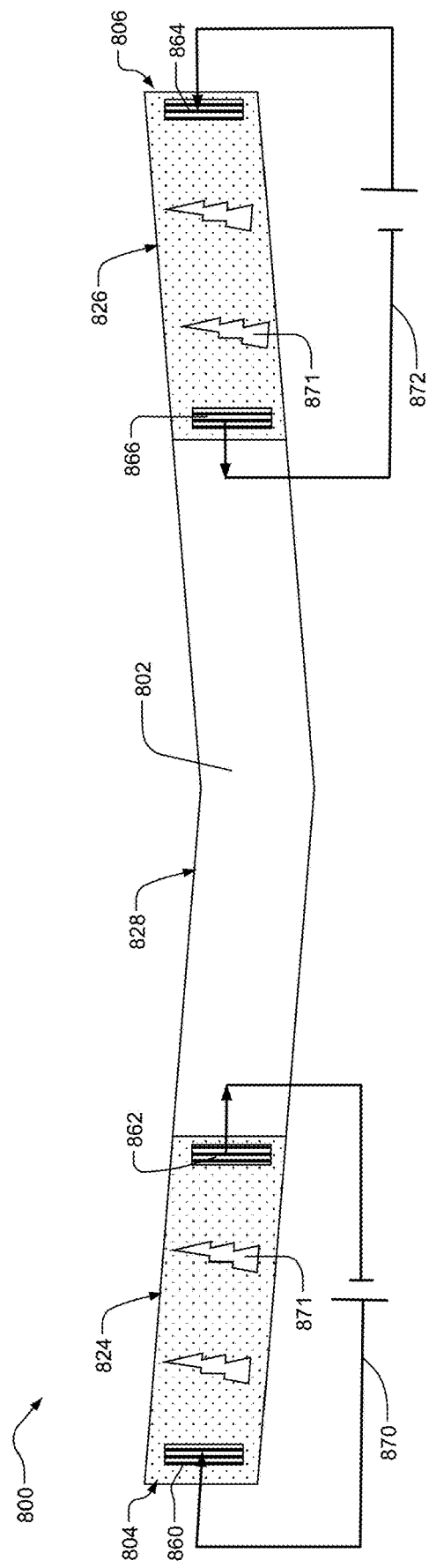
FIG. 8A is a schematic view of another header according to various aspects of the present disclosure.

A header according to various aspects of the present disclosure may be configured to be heated across one or more regions or portions of its body, which may be less than the entire body, via heating fibers. In certain aspects, at least a portion of the header is transparent. With reference to FIGS. 8A-8C, a header 800 of an upper body structure, which may be similar to the upper body structure 100 of FIG. 1 except for the header 800, according to various aspects of the present disclosure, is provided. The header 800 may be the same as the header 700 of FIGS. 7A-7C unless otherwise described below. The header 800 includes an elongate body 802. The elongate body 802 extends between a first side 804 and a second side 806 (also referred to as "the sides, 804, 806"). The header 800 includes a first surface 808 and a second surface 810. In certain aspects, as best shown in FIGS. 8B-8C, an IR reflector 812 is disposed adjacent to the first surface 808.

In certain aspects, the header 800 may include one or more regions, such as a first outer region 824 and a second outer region 826 (also referred to as "the outer regions 824, 826"). The outer regions 824, 826 may be the same as or similar to the outer regions 724, 726 of FIGS. 7A-7B. In certain aspects, the header 800 may include an inner region 828 that is at least partially disposed between the first outer region 824 and the second outer region 826. The inner region may be the same as or similar to the inner region 728 of FIGS. 7A-7C unless otherwise described below.

In certain aspects, the header 800 includes a polymer 829 (FIGS. 8B-8C). The polymer 829 may include a transparent polymer. In certain aspects, the outer regions 824, 826 and the inner region 828 may be integrally formed with the same polymer 829. In certain other aspects, the polymer 829 may include more than one polymer, such as a first polymer in the outer regions 824, 826 and a second polymer in the inner region 828. The first polymer in the outer regions 824, 826 may be substantially opaque. The second polymer in the inner region 828 may be substantially transparent.

In certain aspects, as best shown in FIG. 8B, both the first outer region 824 and the second outer region 826 (FIG. 8A) include a plurality of fibers 830. The fibers 830 may include heating fibers, which may be structural heating fibers. In certain aspects, the outer regions 824, 826 are substantially opaque. In certain aspects, the outer regions 824, 826 may have a transparency that is greater than or equal to 0% to less than or equal to about 75%. In certain aspects, as best shown in FIG. 8C, the inner region 828 is substantially free of fibers. In certain aspects, the inner region 828 is substantially transparent. In certain aspects, the inner region 828 has a transparency that is greater than or equal to 0% to less than or equal to about 92%.

In certain aspects, the header 800 includes a plurality of tapes including a first tape 860, a second tape 862, a third tape 864, and a fourth tape 866. The tapes 860, 862, 864, 866 may be the same as or similar to the tapes 760, 762, 764, 766 of FIGS. 7A-7C. In certain aspects, when a current is applied to a first external circuit 870 the first outer region 824 may be configured to generate heat 871 (FIG. 8A) through the body 802 between the first tape 860 and the second tape 862. Similarly, when a current is applied to a second external circuit 872, the second outer region 826 may be configured to generate heat 871 between the third tape 864 and the fourth tape 866. In certain aspects, the inner region 828 is free of heat generating characteristics.

Figure 9A:
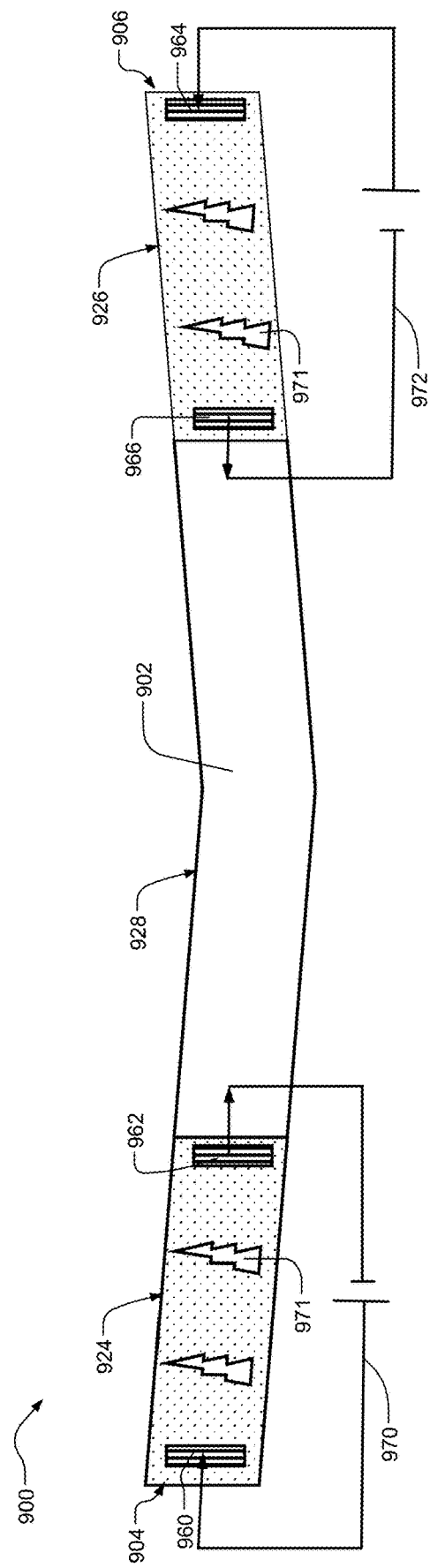
FIG. 9A is a schematic view of another header according to various aspects of the present disclosure.

A header according to various aspects of the present disclosure may be configured to be heated across one or more regions or portions of its body, which may be less than the entire body, via discrete heating element. In certain aspects, at least a portion of the header is transparent. With reference to FIGS. 9A-9C, a header 900 of an upper body structure, which may be similar to the upper body structure 100 of FIG. 1 except for the header 900, according to various aspects of the present disclosure, is provided. The header 900 may be the same as the header 800 of FIGS. 8A-8C unless otherwise described below. The header 900 includes an elongate body 902. The elongate body 902 extends between a first side 904 and a second side 906 (also referred to as "the sides, 904, 906"). The header 900 includes a first surface 908 and a second surface 910. In certain aspects, as best shown in FIGS. 9B-9C, an IR reflector 912 is disposed adjacent to the first surface 908.

In certain aspects, the header 900 may include one or more regions, such as a first outer region 924 and a second outer region 926 (also referred to as "the outer regions 924, 926"). The outer regions 924, 926 may be the same as or similar to the outer regions 824, 826 of FIGS. 8A-8B unless described below. In certain aspects, the header 900 includes an inner region 928 that is disposed between the first outer region 924 and the second outer region 926. The inner region 928 may be the same as or similar to the inner region 828 of FIGS. 8A-8C.

In certain aspects, the header 900 includes a polymer 929 (FIGS. 9B-9C). The polymer 929 may include a transparent polymer. In certain aspects, the outer regions 924, 926 and the inner region 928 may be integrally formed with the same polymer 929. In certain other aspects, the polymer 929 may include more than one polymer, such as a first polymer in the outer regions 924, 926 and a second polymer in the inner region 928. The first polymer in the outer regions 924, 926 may be substantially opaque. The second polymer in the inner region 928 may be substantially transparent.

In certain aspects, as best shown in FIG. 9B, both the first outer region 924 and the second outer region 926 (FIG. 9A) include a plurality of fibers 930. The fibers 930 may be the same as or similar to the fibers 620 of FIGS. 6A-6B. In certain aspects, the fibers 930 include structural fibers. In certain aspects, as best shown in FIG. 9C, the inner region 928 is free of fibers. In certain aspects, the inner region 928 is substantially transparent.

In certain aspects, each of the outer regions 924, 926 includes a heating element 932 (FIG. 9B). The heating element 932 may be a discrete heating element that is the same as or similar to the heating element 622 of FIG. 6A-6B. In certain aspects, the heating element 932 is a heating film. In certain aspects, the heating element 932 is substantially transparent. In certain other aspects the heating element 932 is substantially opaque. In certain aspects, the outer regions 924, 926 are at least partially transparent, such as when there is a lower volume percent of fibers 930 and the heating element 932 is substantially transparent. In certain other aspects, the outer regions 924, 926 are substantially opaque, such as when there is a higher volume percent of fibers 930 and the heating element 932 is substantially opaque.

In certain aspects, the header 900 includes a plurality of tapes including a first tape 960, a second tape 962, a third tape 964, and a fourth tape 966. The tapes 960, 962, 964, 966 may be the same as or similar to the tapes 760, 762, 764, 766 of FIGS. 7A-7C unless otherwise described below. In certain aspects, when a current is applied to a first external circuit 970 the first outer region 924 may be configured to generate heat 971 (FIG. 9A) through the body 902 between the first tape 960 and the second tape 962. Similarly, when a current is applied to a second external circuit 972, the second outer region 926 may be configured to generate heat 971 between the third tape 964 and the fourth tape 966. In certain aspects, the inner region 928 is free of heat generating characteristics.

Figure 10A:
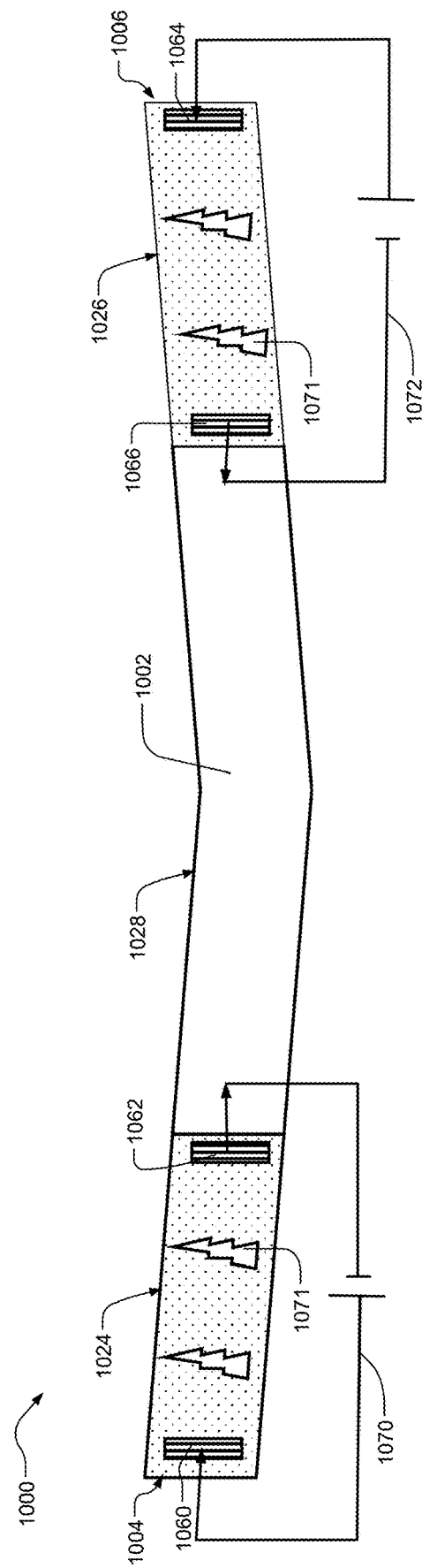
FIG. 10A is a schematic view of another header according to various aspects of the present disclosure.

A header according to various aspects of the present disclosure may be configured to be heated across one or more regions or portions of its body, which may be less than the entire body, via both heating fibers and a discrete heating element. In certain aspects, at least a portion of the header is transparent. Referring to FIGS. 10A-10C, a header 1000 of an upper body structure, which may be similar to the upper body structure 100 of FIG. 1 except for the header 1000, according to various aspects of the present disclosure, is provided. The header 1000 may be the same as the header 800 of FIGS. 8A-8C unless otherwise described below. The header 1000 includes an elongate body 1002. The elongate body 1002 extends between a first side 1004 and a second side 1006 (also referred to as "the sides, 1004, 1006"). The header 1000 includes a first surface 1008 and a second surface 1010. In certain aspects, as best shown in FIGS. 10B-10C, an IR reflector 1012 is disposed adjacent to the first surface 1008.

In certain aspects, the header 1000 may include one or more regions, such as a first outer region 1024 and a second outer region 1026 (also referred to as "the outer regions 1024, 1026"). In certain aspects, the header 1000 includes an inner region 1028 disposed between the first outer region 1024 and the second outer region 1026.

In certain aspects, the header 1000 includes a polymer 1029 (FIGS. 10B-10C). The polymer 1029 may include a transparent polymer. In certain aspects, the outer regions 1024, 1026 and the inner region 1028 may be integrally formed with the same polymer 1029. In certain other aspects, the polymer 1029 may include more than one polymer, such as a first polymer in the outer regions 1024, 1026 and a second polymer in the inner region 1028. The first polymer in the outer regions 1024, 1026 may be substantially opaque. The second polymer in the inner region 1028 may be substantially transparent.

In certain aspects, as best shown in FIG. 10B, both the first outer region 1024 and the second outer region 1026 (FIG. 10A) include a plurality of fibers 1030. The fibers 1030 may be the same as or similar to the fibers 830 of FIGS. 8A-8B. In certain aspects, the outer regions 1024, 1026 further include a discrete heating element 1032. The discrete heating element 1032 may be the same as or similar to the heating element 526 of FIGS. 5A-5B and the heating element 932 of FIGS. 9A-9B except that the discrete heating element 1032 is adjacent to the second surface 1010 of the header 1000.

In certain aspects, as best shown in FIG. 10C, the inner region 1028 is free of fibers. In certain aspects, the inner region 1028 is free of the discrete heating element. In certain aspects, the inner region 1028 is substantially transparent and free of heat generating characteristics.

In certain aspects, the header 1000 includes a plurality of tapes including a first tape 1060, a second tape 1062, a third tape 1064, and a fourth tape 1066. The tapes 1060, 1062, 1064, 1066 may be the same as or similar to the tapes 760, 762, 764, 766 of FIGS. 7A-7C unless otherwise described below. In certain aspects, when a current is applied to a first external circuit 1070 the first outer region 1024 may be configured to generate heat 1071 (FIG. 10A) between the first tape 1060 and the second tape 1062. Similarly, when a current is applied to a second external circuit 1072, the second outer region 1026 may be configured to generate heat 1071 between the third tape 1064 and the fourth tape 1066.

Figure 13:
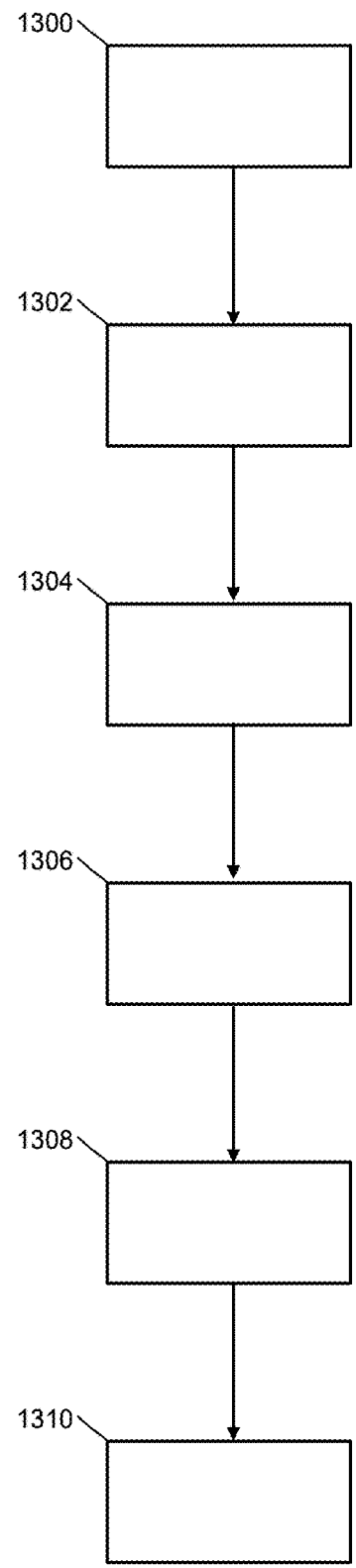
FIG. 13 is a flowchart depicting a method of manufacturing a vehicle component according to various aspects of the present disclosure.

In various aspects, the present disclosure provides a method of making a vehicle component, such as a header. With reference to FIG. 13, the method generally includes forming a fiber mat including thermoplastic polymer fibers and one or both of structural fiber and/or heating fiber at 1300, forming a fiber mat assembly including the fiber mat and a backing at 1302, optionally removing one or more portions of the backing at 1304, forming a composite at 1306, forming the vehicle component at 1308, and optionally coupling additional components to the vehicle component at 1310. Each of these steps is described in greater detail below.

Forming the fiber mat at 1300 may include co-mingling a first plurality of fibers and a second plurality of fibers. The first plurality of fibers includes thermoplastic polymer fibers. The second plurality of fibers includes structural fibers and/or heating fibers (e.g., carbon fibers). In certain aspects, the fiber mat may be referred to as a dry co-mingled fiber mat. The fiber mat may include one or more layers. The thermoplastic polymer fiber may include a first thermoplastic polymer. The structural and/or heating fibers may be arranged as desired based on the vehicle component to be formed. The first and second fibers may be distributed homogeneously or non-homogeneously within the fiber mat. For example, the structural and/or heating fibers may be arranged as described in any of the embodiments described above. In certain aspects, the method may include forming more than one fiber mat.

In certain aspects, the method optionally includes placing a portion of the fibers (e.g., the structural and/or heating fibers) into a plurality of tow-lines (e.g., by tape). The tow-lines may be formed into a geometric shape, such as a plurality of polygons (e.g., hexagons). In certain aspects, the method includes forming one or more regions of fibers. In certain aspects, two outer regions are formed including a first portion of fibers in a plurality of woven layers and an inner region disposed between the two outer regions is formed including a second portion of fibers formed in a plurality of tow-lines.

Forming the fiber mat assembly at 1302 includes stitching the fiber mat to a backing, such as a polymer film. The polymer film may include a second thermoplastic polymer. The second thermoplastic polymer may be the same as or different than the first thermoplastic polymer. The stitching may be performed using an embroidery process.

The fiber mat assembly may include additional components, such as a discrete heating element, tape, and/or conductive paste. Accordingly, forming the fiber mat assembly may further include adding a discrete heating element, such as a heating film, to the plurality of fibers, such as on a side of the fibers and/or embedded between layers of fibers. Forming the fiber mat assembly may further include embedding a conductive tape between fibers and/or layers of fibers. The method may further include applying a conductive paste adjacent to the conductive tape.

The method optionally includes removing all or a portion of the backing at 1304. For example, a portion of the backing may be removed in local areas where structural fibers or heating fibers are not present. In certain aspects, removing may include cutting. The resulting assembly may define holes or other void spaces where backing is removed.

Forming the composite at 1306 includes consolidating the fiber mat assembly under heat and pressure. During consolidation, the first and second thermoplastic polymers may melt and flow into void spaces between the structural and/or heating fibers, which do not melt and flow during consolidation. Accordingly, the composite includes a polymer matrix and embedded structural and/or heating fibers. When the first and second thermoplastic polymers are the same, the resulting polymer matrix may have a unitary and substantially homogeneous structure such that the first and second polymers become substantially indistinguishable and substantially no boundaries between first and second polymer remain. The resulting composite may be in a form of a sheet or a desired three-dimensional shape. In certain aspects, consolidating may include forming the composite into a desired shape based on the vehicle component to be formed, such as by using a heated mold. In certain aspects, when the fibers include structural fibers, the composite may be referred to as a structural composite.

Forming the vehicle component at 1308 may include placing the composite in a mold and infusing or injecting a polymer around at least a portion of the composite. The polymer may include a third thermoplastic polymer. The third thermoplastic polymer may be the same as or different from the first thermoplastic polymer. The third thermoplastic polymer may be the same as or different from the second thermoplastic polymer. In one example, the first, second, and third thermoplastic polymers are all the same polymer (e.g., transparent polycarbonate). In certain aspects, the method may include placing the composite into a mold and injection molding, injection-compression molding, or injection molding to at least partially embedded the composite in the third thermoplastic polymer. The resulting vehicle component includes the structural fibers and/or heating fibers embedded in a polymer matrix.

When the first, second, and third thermoplastic polymers are the same, a resulting polymer matrix of the vehicle component may have a unitary and substantially homogeneous structure such that the first, second, and third polymers become substantially indistinguishable and substantially no boundaries between first, second, and third polymers remain. In certain other aspects, one or more of the first, second, and third thermoplastic polymers may be different. The first, second, and third thermoplastic polymers may be chosen to have good matrix adhesion such that the resulting polymer matrix is substantially continuous. In certain aspects, one or more of the first, second, and third thermoplastic polymers may include an additive, such as a pigment to create a tinted polymer.

At 1310, the method optionally includes coupling the vehicle component to additional components. In one example, the vehicle component is a header and the method further includes attaching an IR reflector, as described above.

Although the structures and related methods herein are described in the context of vehicle headers, they are also applicable to other vehicle components, such as doors, interior panels, structural components, etc., by way of example. Moreover, while the present technology is particularly suitable for use in components of an automobile or other vehicles (e.g., motorcycles, boats, tractors, buses, motorcycles, trains, mobile homes, campers, and tanks), they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of example.

Example 1

Figure 11B:
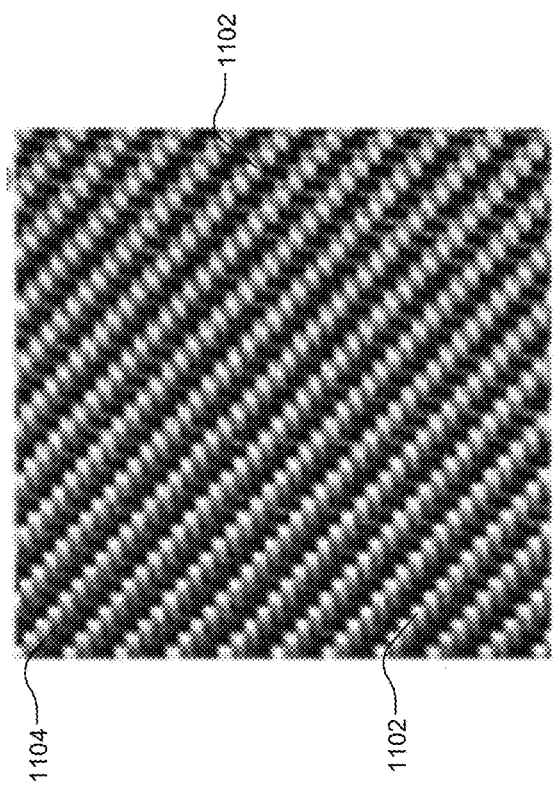
FIG. 11B is a photograph of a plurality of fibers of the header of FIG. 11A.
Figure 11A:
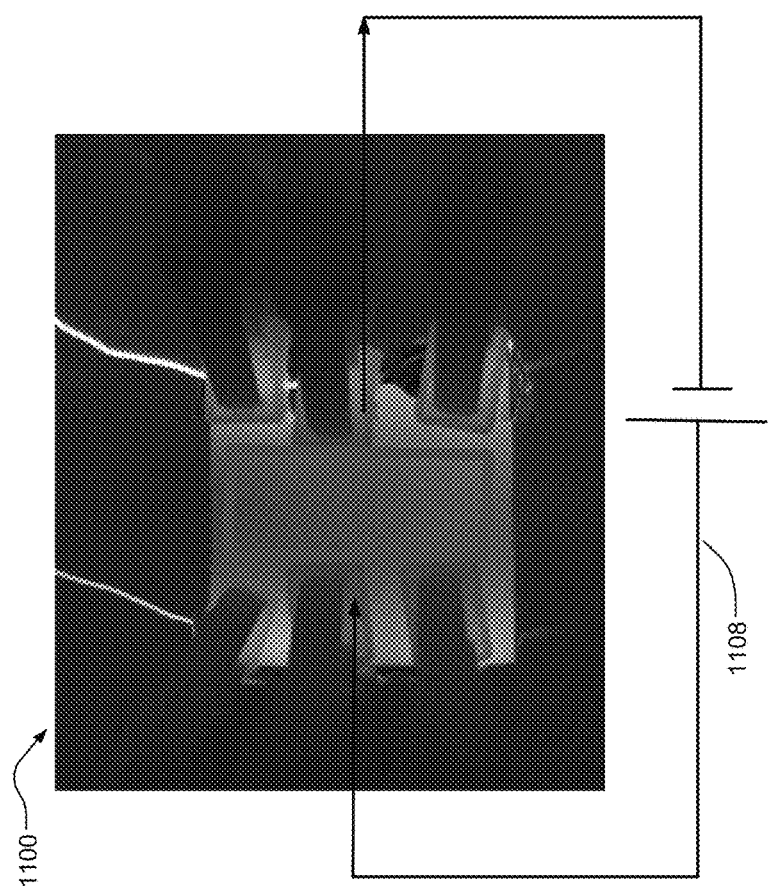
FIG. 11A is a thermal image of a heated portion of a header according to various aspects of the present disclosure.

Referring to FIG. 11A, a thermal image of a heated portion of a header 1100 according to various aspects of the present disclosure is provided. The header 1100 includes a plurality of carbon fibers 1102 (FIG. 11B) (also referred to as "the carbon fibers 1102"). As best shown in FIG. 11B, the carbon fibers 1102 are embroidered into a woven fabric 1104. The header 1100 includes a plurality of layers (not shown) of the woven carbon fibers 1102. A first and a second copper tape are placed at a first side or end and a second side or end of the header 1100, respectively (not shown). A 2 ampere (Amp.) current is applied to the header 1100 by an external circuit 1108. FIG. 11A shows a thermal image of the header 1100 when the 2 Amp. current is applied for 300 seconds.

Figure 11C:
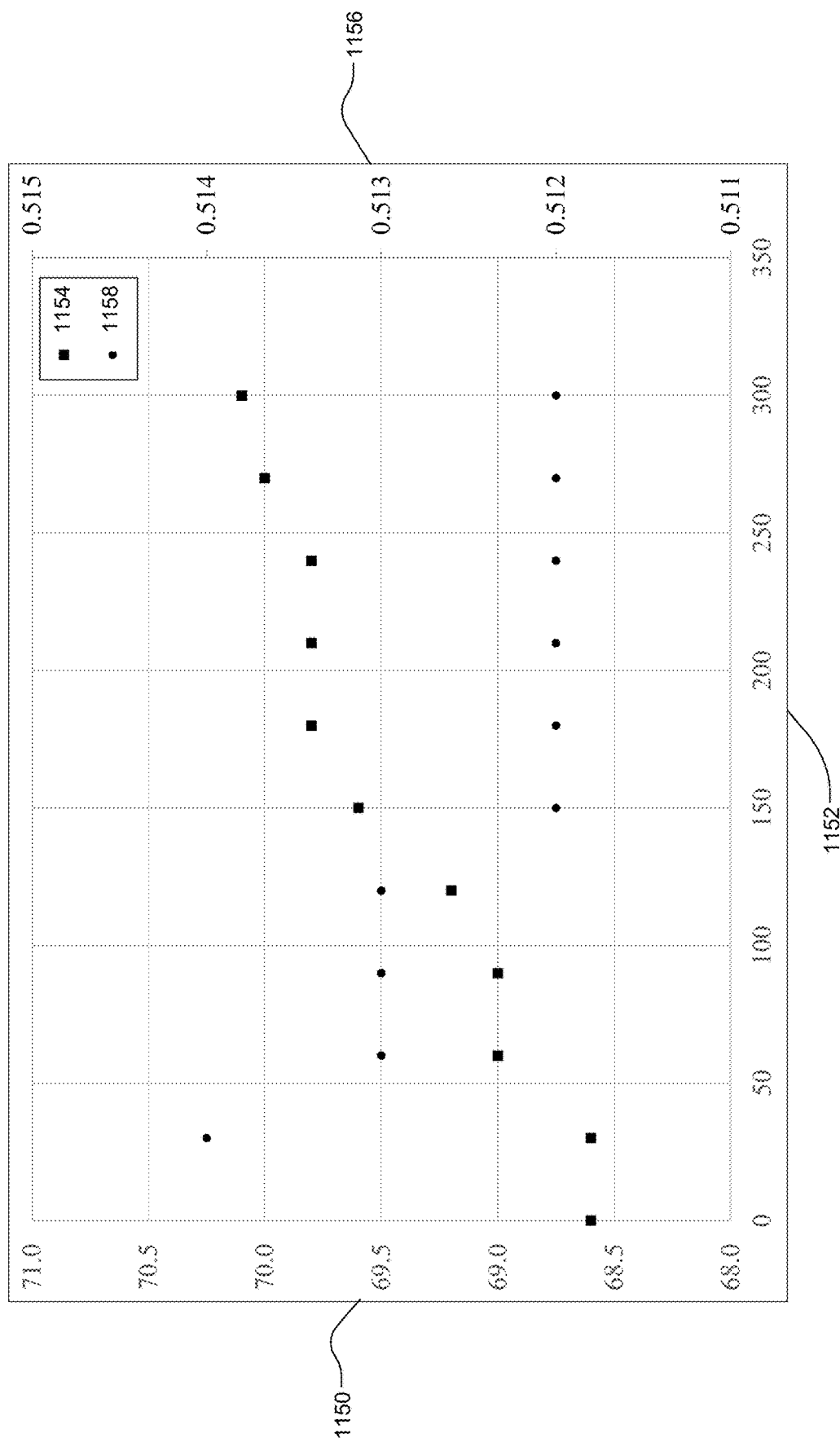
FIG. 11C is a plot of temperature versus time and voltage versus time when a 2 ampere current is applied to the header of FIG. 11A.

The plots of header temperature (° F.) 1150 versus time (seconds) 1152 are shown in data set 1154 in FIG. 11C. As shown, when the 2 Amp. current is applied to the header 1100, the header temperature increases as time increases.

The plots of voltage (V) 1156 versus time (seconds) 1152 are shown in data set 1158 in FIG. 11C. As shown, when the 2 Amp. current is applied to the header 1100, the voltage decreases as time increases.

Example 2

Figures 12A, 12B:
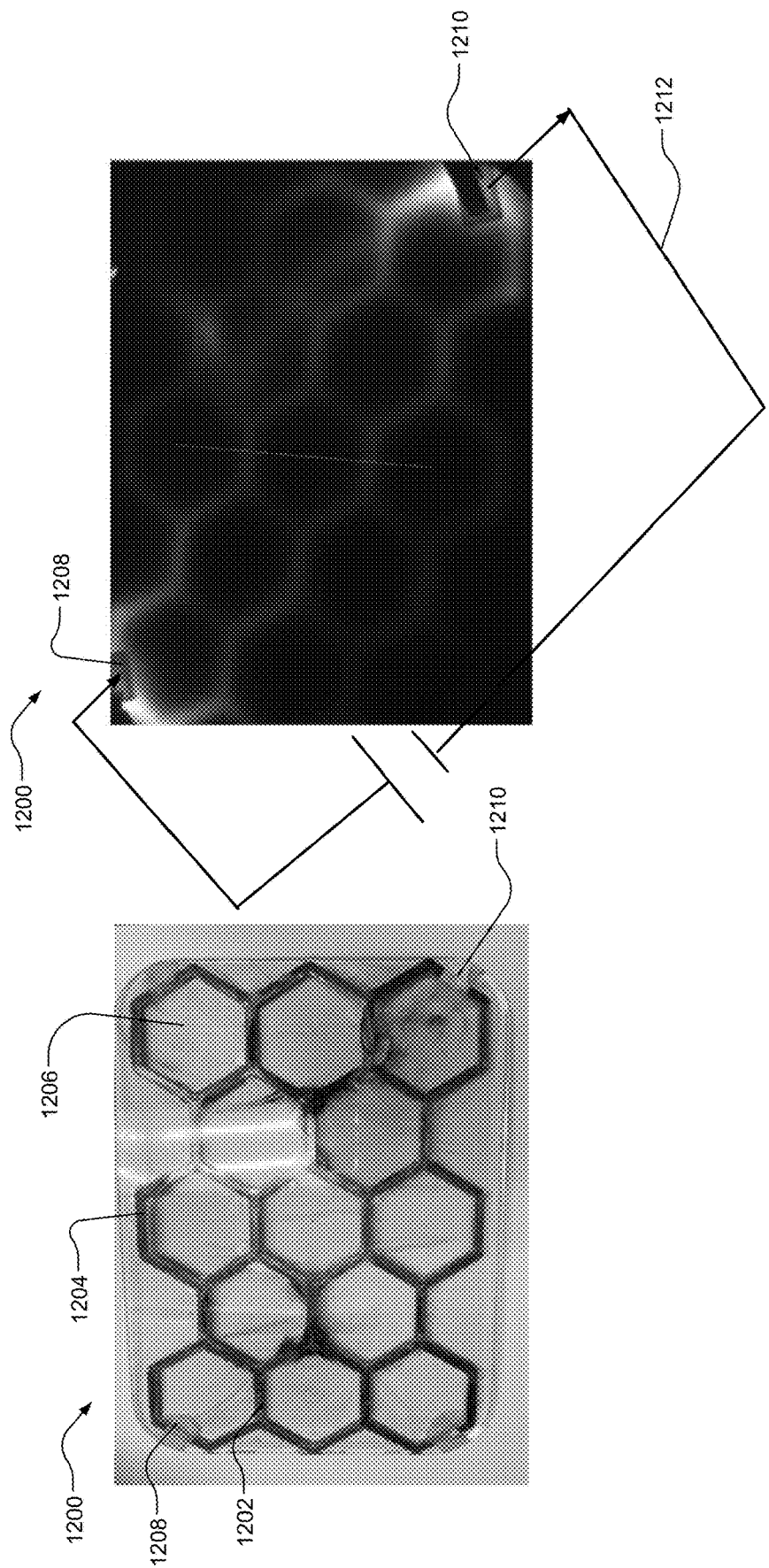
FIG. 12A is a photograph of a heated, partially transparent portion of a header according to various aspects of the present disclosure.
FIG. 12B is a thermal image of the portion of the header of FIG. 12A.

With reference to FIGS. 12A, a photograph of a top view of a partially transparent portion of a header 1200 according to various aspects of the present disclosure is provided. The header 1200 includes a plurality of carbon fibers 1202. The carbon fibers 1202 are formed into a plurality of tow-lines 1204 that are placed locally (e.g., by tape) into a substantially hexagonal formation. The placement of the carbon fibers 1202 into the tow-lines 1204 forms a plurality of inner areas 1206 that are substantially free of fibers. The inner areas 1206 are substantially transparent.

A current is applied to a first end 1208 and a second end 1210 of the portion of the header 1200. An external circuit 1212 is formed by applying the current to the header 1200. With reference to FIG. 12B, a thermal image of the portion of the header 1200 when a 2 Amp. current is applied for 300 seconds is provided.

Figure 12C:
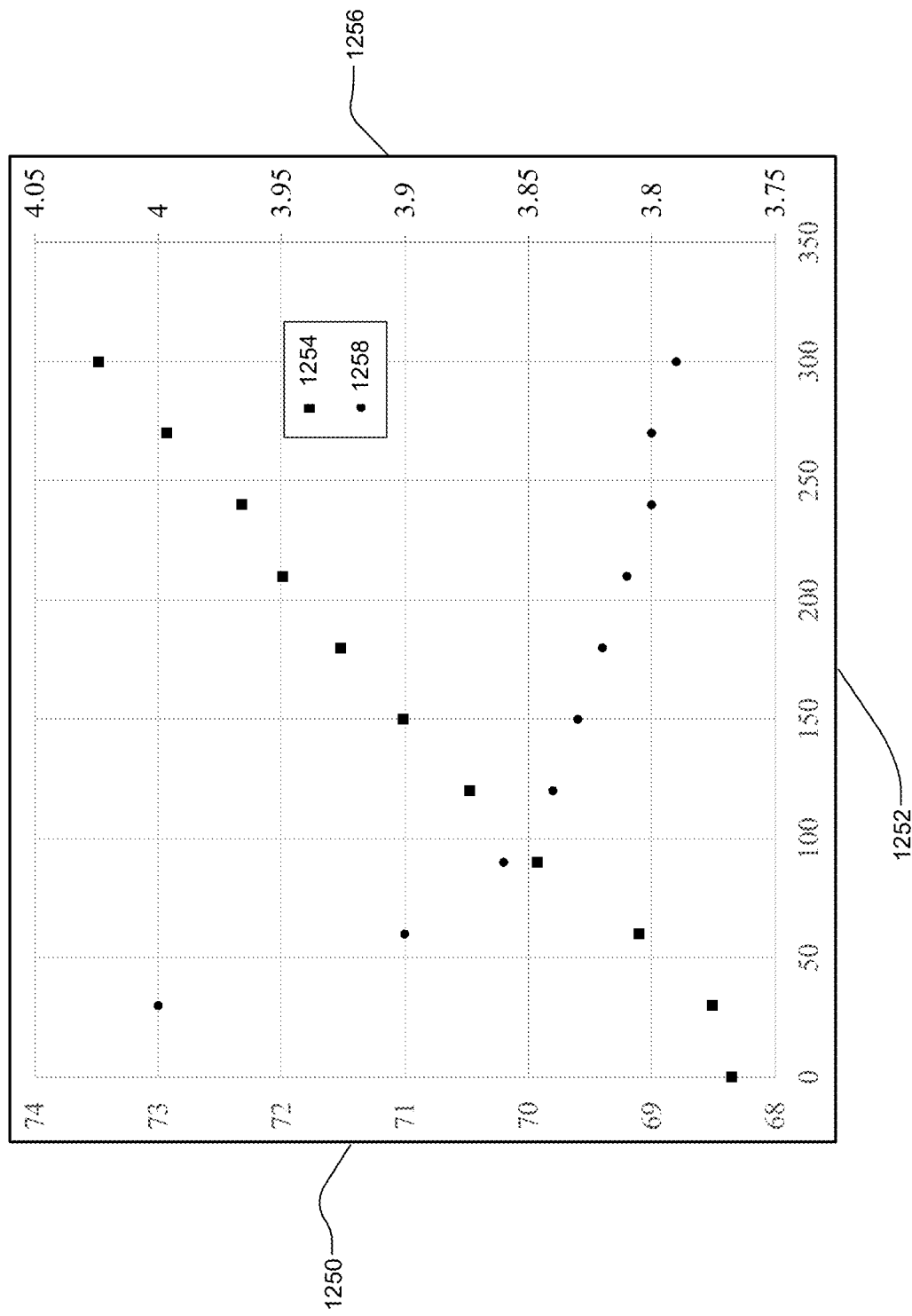
FIG. 12C is a plot of temperature versus time when a 2 ampere current is applied to the portion of the header of FIG. 12A.

The plots of header temperature (° F.) 1250 versus time (seconds) 1252 when the 2 Amp. current is applied are shown in data set 1254 in FIG. 12C. As shown, when the 2 Amp. current is applied to the header 1200, the header temperature increases as time increases.

The plots of voltage (V) 1256 versus time (seconds) 1252 are shown in data set 1258 in FIG. 12C. As shown, when the 2 Amp. current is applied to the header 1200, the voltage decreases as time increases.

A 1.6 Amp. current is applied to the header 1200 by the external circuit 1212. The plots of header temperature (° F.) 1260 versus time (seconds) 1262 when the 1.6 Amp. current is applied are shown in data set 1264 in FIG. 12D. As shown, when the 1.6 Amp. current is applied to the header 1200, the header temperature increases as time increases.

Figure 12D:
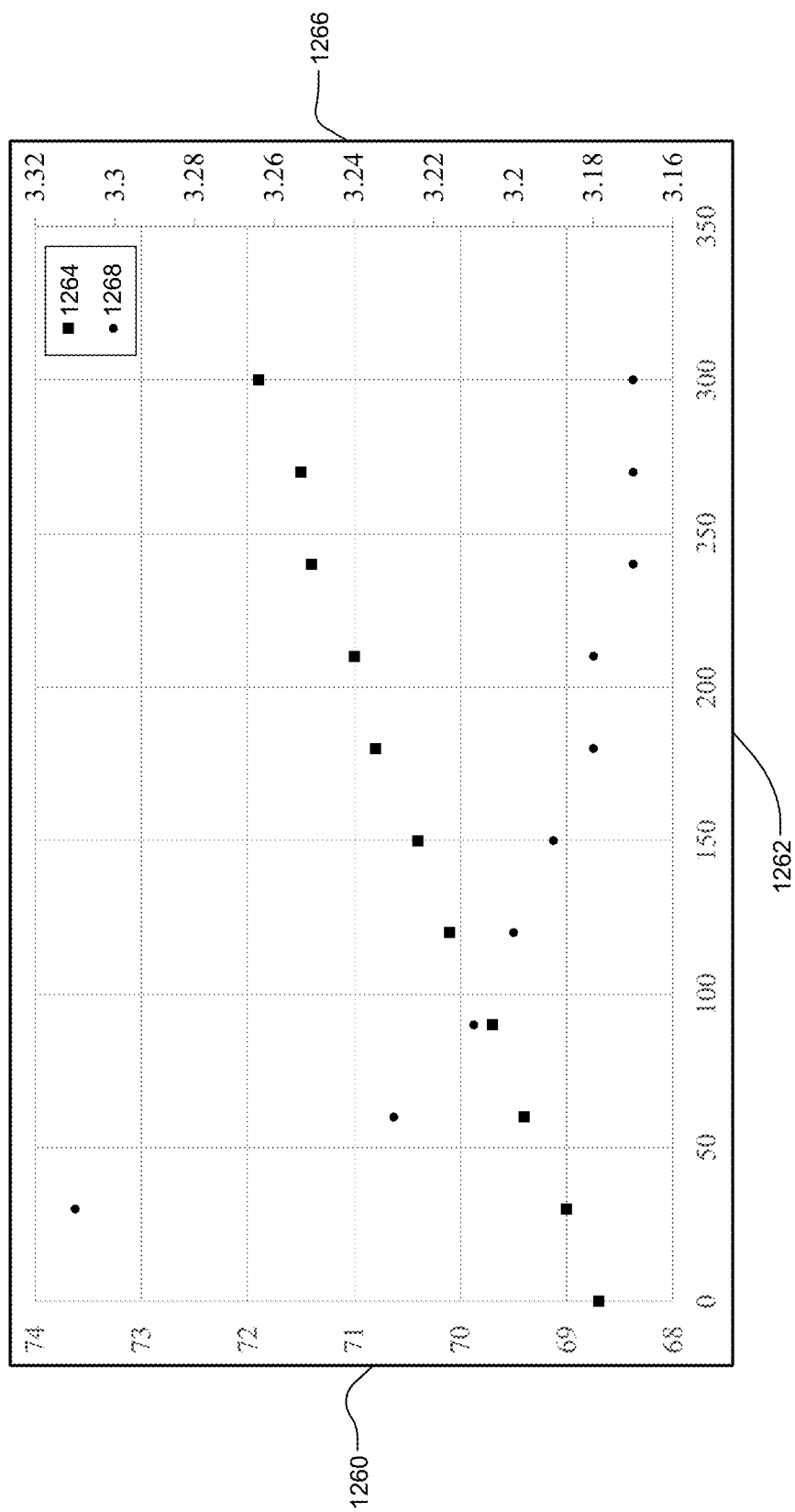
FIG. 12D is a plot of temperature versus time when a 1.6 ampere current is applied to the portion of the header of FIG. 12A.

The plots of voltage (V) 1266 versus time (seconds) 1262 are shown in data set 1268 in FIG. 12D. As shown, when the 1.6 Amp. current is applied to the header 1200, the voltage decreases as time increases.

Figure 12E:
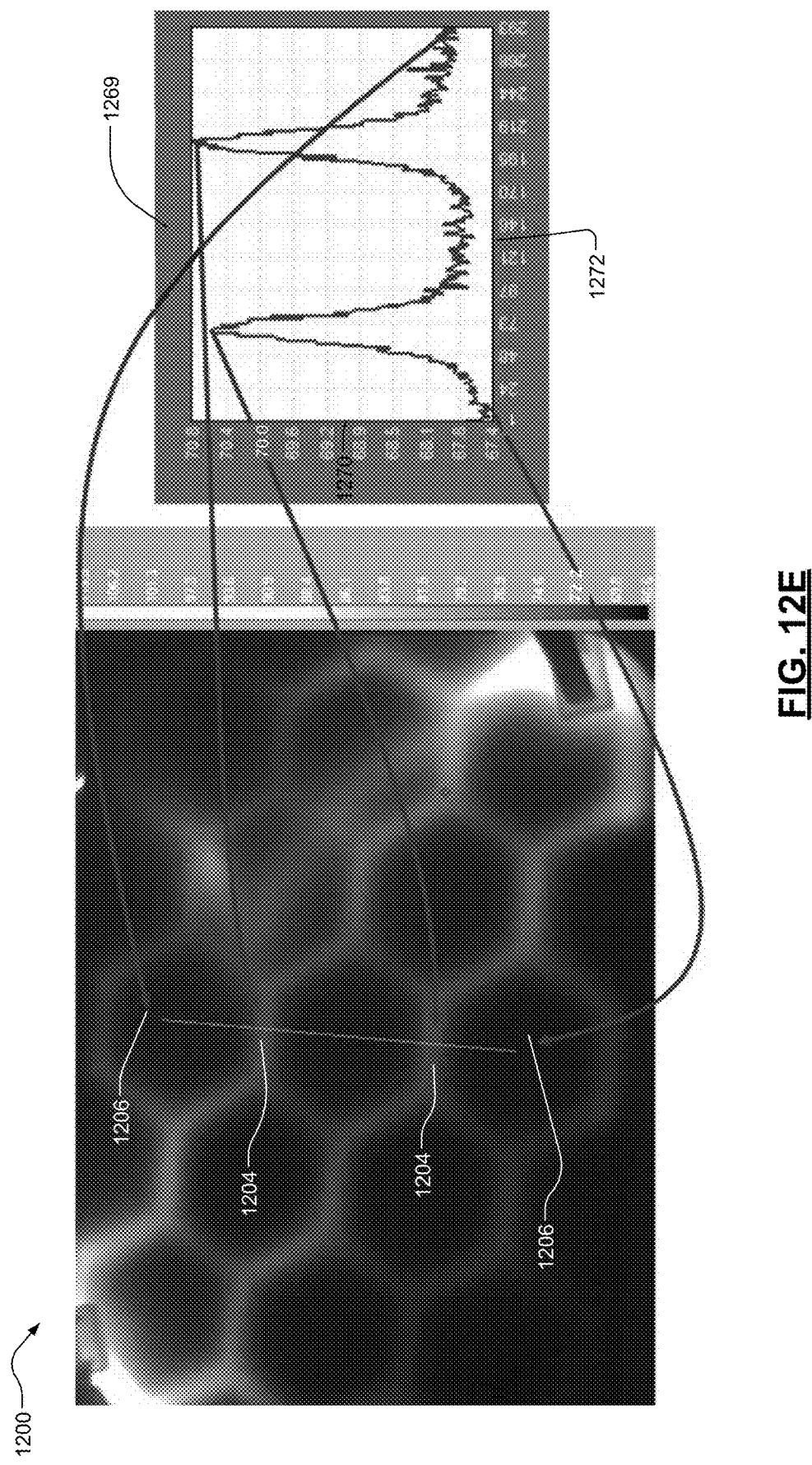
FIG. 12E is a thermal image of FIG. 12B and a line scan of the thermal image of FIG. 12B.

With reference to FIG. 12E, a line scan 1269 of the thermal image of FIG. 12B of the heated portion of the header 1200 when a current is applied by the external circuit 1212 is shown. A plot of temperature (° F.) 1270 versus thermal image pixels 1272 is provided. As shown, the temperature is the highest at the tow-lines 1204 including the carbon fibers 1202. The temperature is relatively the lowest at the inner areas 1206 that are substantially free of the carbon fibers 1202. When the current is applied by the external circuit 1212, heat is generated by the conductive carbon fibers 1202 in the header 1200.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle component comprising:
   a polymer matrix;
   a plurality of fibers in the polymer matrix; and
   a heating element embedded in the polymer matrix, the heating element being (i) a discrete heating element, (ii) at least a portion of the plurality of fibers, or both (i) and (ii), wherein the heating element is configured to be coupled to an external circuit to generate heat,
   wherein the vehicle component is a header comprising an elongated body extending between a first side and a second side.

2. The vehicle component of claim 1, wherein
   the heating element comprises the at least a portion of the plurality of fibers, and
   the at least a portion of the plurality of fibers comprise carbon fibers.

3. The vehicle component of claim 1, wherein the heating element comprises the discrete heating element, the discrete heating element comprising a film, and the film including at least one layer.

4. The vehicle component of claim 3, wherein the discrete heating element includes a material selected from the group consisting of: indium tin oxide (ITO), graphene, carbon nanotube (CNT), silver nanowire, or combinations thereof.

5. The vehicle component of claim 1, wherein the plurality of fibers is selected from the group consisting of: carbon fibers, glass fibers, basalt fibers, aramid fibers, natural fibers, polyethylene fibers, polypropylene fibers, or any combination thereof.

6. The vehicle component of claim 1, wherein the plurality of fibers comprises a plurality of layers of woven fibers.

7. The vehicle component of claim 1, wherein the plurality of fibers comprises a plurality of tow-lines of fibers and the plurality of tow-lines cooperate to form a substantially polygonal shape.

8. The vehicle component of claim 1, wherein
   the plurality of fibers comprises a first portion and a second portion, the first portion comprising a plurality of layers of woven fibers, and
   the second portion comprises a plurality of tow-lines of fibers, the plurality of tow-lines cooperating to form a substantially polygonal shape.

9. The vehicle component of claim 1, wherein the elongate body further comprises an infrared (IR) reflector disposed adjacent to a first surface of the elongate body.

10. The vehicle component of claim 1, wherein the elongate body further includes a plurality of conductive tapes configured to electrically couple the heating element to the external circuit, the plurality of conductive tapes comprising copper tapes.

11. The vehicle component of claim 10, wherein
    the plurality of conductive tapes includes a first conductive tape and a second conductive tape,
    the first conductive tape is coupled to the first side and the second conductive tape coupled to the second side, and
    the elongate body is configured to generate heat between the first side and the second side.

12. The vehicle component of claim 10, wherein
    the heating element includes a first heating element and a second heating element,
    the plurality of conductive tapes includes a first conductive tape, a second conductive tape, a third conductive tape, and a fourth conductive tape, and
    the elongate body further comprises,
    a first region comprising the first heating element extending between a first end and a second end, the first conductive tape being coupled to the first end and the second conductive tape being coupled to the second end, the first region being configured to generate heat between the first end and the second end, a second region comprising the second heating element extending between a third end and a fourth end, the third conductive tape being coupled to the third end and the fourth conductive tape being coupled to the fourth end, the second region being configured to generate heat between the third end and the fourth end, and a third region disposed between the first region and the second region, the third region being free of the heating element.

13. A method of making a vehicle component, the method comprising:

preparing a fiber mat including a first plurality of fibers and a second plurality of fibers, the first plurality of fibers including a first thermoplastic polymer, the second plurality of fibers including structural fibers, heating fibers, or both structural fibers and heating fibers;

forming a fiber mat assembly by stitching the fiber mat to a backing, the backing including a film, the film including a second thermoplastic polymer;

forming a composite by consolidating the fiber mat assembly under heat and pressure; and forming the vehicle component by injecting a third thermoplastic polymer around at least a portion of the composite, wherein the vehicle component comprises,
a polymer matrix;
a plurality of fibers in the polymer matrix; and
a heating element embedded in the polymer matrix, the heating element being (i) a discrete heating element, (ii) at least a portion of the plurality of fibers, or both (i) and (ii), wherein the heating element is configured to be coupled to an external circuit to generate heat, and wherein the vehicle component is a header comprising an elongated body extending between a first side and a second side.

14. The method of claim 13, wherein
the first thermoplastic polymer, the second thermoplastic polymer, and the third thermoplastic polymer comprise polycarbonate, and
the second plurality of fibers includes carbon fibers.

15. The vehicle component of claim 1, wherein at least a portion of the elongated body has a transparency of greater than 0%.

16. The vehicle component of claim 15, wherein the heating element comprises the discrete heating element, the discrete heating element comprising a film, the film being (i) at least partially transparent, (ii) at least partially opaque, or both (i) and (ii).

17. The vehicle component of claim 12, wherein at least a portion of the elongated body has a transparency of greater than 0%.

18. The vehicle component of claim 17, wherein the first region and the second region each have a transparency that is greater than or equal to 0% to less than or equal to about 75%, and the third region has a transparency that is greater than 0% to less than or equal to about 92%.

19. The vehicle component of claim 1, wherein the polymer comprises polycarbonate and wherein the plurality of fibers comprises carbon fibers.

20. The vehicle component of claim 19, wherein the heating element comprises the discrete heating element, the discrete heating element comprising a film, and the film comprising at least one layer.

* * * * *